United States Patent
Asanuma et al.

(10) Patent No.: US 10,170,939 B2
(45) Date of Patent: Jan. 1, 2019

(54) FOREIGN OBJECT DETECTOR, POWER TRANSMITTING DEVICE AND POWER RECEIVING DEVICE FOR WIRELESS POWER TRANSMISSION, AND WIRELESS POWER TRANSMISSION SYSTEM

(71) Applicant: Panasonic Intellectual Property Management Co., Ltd., Osaka (JP)

(72) Inventors: Kenichi Asanuma, Osaka (JP); Atsushi Yamamoto, Kyoto (JP); Hiroshi Yamamoto, Osaka (JP); Hiroshi Kanno, Osaka (JP)

(73) Assignee: Panasonic Intellectual Property Management Co. Ltd., Osaka (JP)

( * ) Notice: Subject to any disclaimer, the term of this patent is extended or adjusted under 35 U.S.C. 154(b) by 40 days.

(21) Appl. No.: 15/118,165

(22) PCT Filed: Feb. 28, 2014

(86) PCT No.: PCT/JP2014/001094
§ 371 (c)(1),
(2) Date: Aug. 11, 2016

(87) PCT Pub. No.: WO2015/128901
PCT Pub. Date: Sep. 3, 2015

(65) Prior Publication Data
US 2017/0179772 A1    Jun. 22, 2017

(51) Int. Cl.
*H02J 50/12* (2016.01)
*H02J 7/02* (2016.01)
(Continued)

(52) U.S. Cl.
CPC .............. *H02J 50/12* (2016.02); *H02J 7/025* (2013.01); *H02J 17/00* (2013.01); *H02J 50/60* (2016.02); *H02J 50/80* (2016.02); *H02J 50/90* (2016.02)

(58) Field of Classification Search
CPC ...................................................... H02J 50/60
See application file for complete search history.

(56) References Cited

U.S. PATENT DOCUMENTS 9,595,834 B2 *   3/2017   Yamamoto ............... G01V 3/10
9,728,982 B2 *   8/2017   Yamamoto ............... G01V 3/10
(Continued)

FOREIGN PATENT DOCUMENTS

| JP | 2009-501000 A | 1/2009 |
|----|---------------|--------|
| JP | 2009-118587 A | 5/2009 |

(Continued)

OTHER PUBLICATIONS

International Search Report for corresponding International Application No. PCT/JP2014/001094 dated Mar. 25, 2014.
(Continued)

*Primary Examiner* — Rexford Barnie
*Assistant Examiner* — David Shiao
(74) *Attorney, Agent, or Firm* — Renner, Otto, Boisselle & Sklar, LLP

(57) ABSTRACT

A foreign object detector detects a metallic foreign object between a first resonator and a second resonator which is composed of a parallel resonant circuit including a coil and a capacitor. The foreign object detector includes the first resonator; an oscillator circuit capable of oscillating at a first frequency (f1) which is lower than a resonant frequency (fr) of the second resonator and at a second frequency (f2) which is higher than the resonant frequency (fr); and a measurement circuit to measure changes in input impedance of the first resonator. The measurement circuit detects a metallic foreign object between the first resonator and the second resonator based on: changes in input impedance of the first resonator as measured by the measurement circuit while the oscillator circuit is oscillating at the first frequency f1; and
(Continued)

changes in input impedance of the first resonator as measured by the measurement circuit while the oscillator circuit is oscillating at the second frequency f2.

25 Claims, 17 Drawing Sheets

(51) Int. Cl.
*H02J 50/60* (2016.01)
*H02J 50/90* (2016.01)
*H02J 50/80* (2016.01)
*H02J 17/00* (2006.01)

(56) References Cited

U.S. PATENT DOCUMENTS

| | | | | |
|---|---|---|---|---|
| 9,843,200 | B2 * | 12/2017 | Sakata | H02J 5/005 |
| 2009/0261778 | A1 | 10/2009 | Kook | |
| 2010/0328044 | A1 * | 12/2010 | Waffenschmidt | H02J 7/025 340/10.4 |
| 2012/0119576 | A1 * | 5/2012 | Kesler | B60L 11/182 307/10.1 |
| 2013/0027078 | A1 | 1/2013 | Nakano et al. | |
| 2013/0063160 | A1 | 3/2013 | Nakano et al. | |
| 2013/0181724 | A1 * | 7/2013 | Teggatz | G01N 27/02 324/629 |
| 2014/0077617 | A1 | 3/2014 | Nakano et al. | |
| 2014/0125287 | A1 | 5/2014 | Nakano et al. | |
| 2014/0252868 | A1 * | 9/2014 | Yamada | H01F 38/14 307/104 |
| 2015/0326028 | A1 | 11/2015 | Suzuki et al. | |

FOREIGN PATENT DOCUMENTS

| | | |
|---|---|---|
| JP | 2012-213270 A | 11/2012 |
| JP | 2012-244732 A | 12/2012 |
| JP | 2013-017336 A | 1/2013 |
| JP | 2013-027255 A | 2/2013 |
| JP | 2013-059236 A | 3/2013 |
| WO | WO 2013/042224 A1 | 3/2013 |

OTHER PUBLICATIONS

International Preliminary Report on Patentability for corresponding International Application No. PCT/JP2014/001094 dated Jun. 9, 2015.

* cited by examiner f1: ODD MODE f2: EVEN MODE

FOREIGN OBJECT DETECTOR, POWER TRANSMITTING DEVICE AND POWER RECEIVING DEVICE FOR WIRELESS POWER TRANSMISSION, AND WIRELESS POWER TRANSMISSION SYSTEM

TECHNICAL FIELD

The present disclosure relates to a foreign object detector for detecting a foreign object between coils. The present disclosure also relates to a power transmitting device and a power receiving device for wireless power transmission, as well as a wireless power transmission system, which include such a foreign object detector and which transmit electric power in a non-contacting manner.

BACKGROUND ART

In recent years, development efforts have been directed to various wireless power transmission systems for wirelessly charging electronic devices and EV devices which involve mobility, e.g., mobile phones and electric vehicles. Wireless power transmission techniques include the electromagnetic induction approach and the magnetic field resonance approach, in which a plurality of coils are placed in opposing relationship, and the electric field coupling approach, in which a plurality of metal plates are placed in opposing relationship. A wireless power transmission system of the electromagnetic induction approach includes a power transmitting device which has a power transmitting coil (power transmitting antenna) and a power receiving device which has a power receiving coil (power receiving antenna). As the power receiving coil captures a magnetic field which is generated in the power transmitting coil, electric power can be transmitted without involving direct contact between electrodes.

Patent Document 1 discloses an example of such a wireless power transmission system.

CITATION LIST

Patent Literature

[Patent Document 1] Japanese Laid-Open Patent Publication No. 2012-244732

SUMMARY OF INVENTION

Technical Problem

In conducting power transmission in a wireless power transmission system, if a metallic foreign object exists between the power transmitting and power receiving coils, there is a risk of an eddy current occurring in the metallic foreign object, and resultant heating. Therefore, in order to achieve safe and highly efficient wireless power transmission, detection of foreign objects between the power transmitting coil and the power receiving coil would be an essential function.

Against such problems, Patent Document 1 discloses: in a circuit including a primary coil which electromagnetically couples to a secondary coil, a Q factor on the primary side and an efficiency of power transmission with respect to the secondary coil are measured; this efficiency of power transmission is corrected by using the Q factor of the primary coil; and based on the resultant corrected value, a state of electromagnetic coupling with the secondary coil is detected.

The method of Patent Document 1 requires measuring an efficiency between the power transmitting and power receiving coils, thus creating a need to feed back the result of efficiency measurement from the power-receiving side to the power-transmitting side.

An embodiment of the present disclosure provides a foreign object detector which does not require feedback of a result of efficiency measurement from the power-receiving side to the power-transmitting side. Moreover, an embodiment of the present disclosure is able to provide a power transmitting device and a power receiving device for wireless power transmission, as well as a wireless power transmission system, which include such a foreign object detector.

Solution to Problem

In order to solve the aforementioned problems, a foreign object detector according to an implementation of the present disclosure is a foreign object detector for detecting a metallic foreign object between a first resonator and a second resonator which is electromagnetically coupled to the first resonator, the second resonator being composed of a parallel resonant circuit including a coil and a capacitor, the foreign object detector comprising: the first resonator; an oscillator circuit capable of oscillating at a first frequency (f1) which is lower than a resonant frequency (fr) of the second resonator and at a second frequency (f2) which is higher than the resonant frequency (fr); and a measurement circuit to measure changes in input impedance of the first resonator, wherein, the measurement circuit is configured to detect a metallic foreign object between the first resonator and the second resonator based on: changes in input impedance of the first resonator as measured by the measurement circuit while the oscillator circuit is oscillating at the first frequency f1; and changes in input impedance of the first resonator as measured by the measurement circuit while the oscillator circuit is oscillating at the second frequency f2.

The aforementioned general/specific implementation can be implemented by using a system, a method, or a computer program, or can be realized by using a combination of a system, a method, and a computer program.

Advantageous Effects of Invention

According to an embodiment of the present disclosure, a foreign object between coils can be detected, thus enabling safe power transmission.

DESCRIPTION OF EMBODIMENTS

Figure 1:
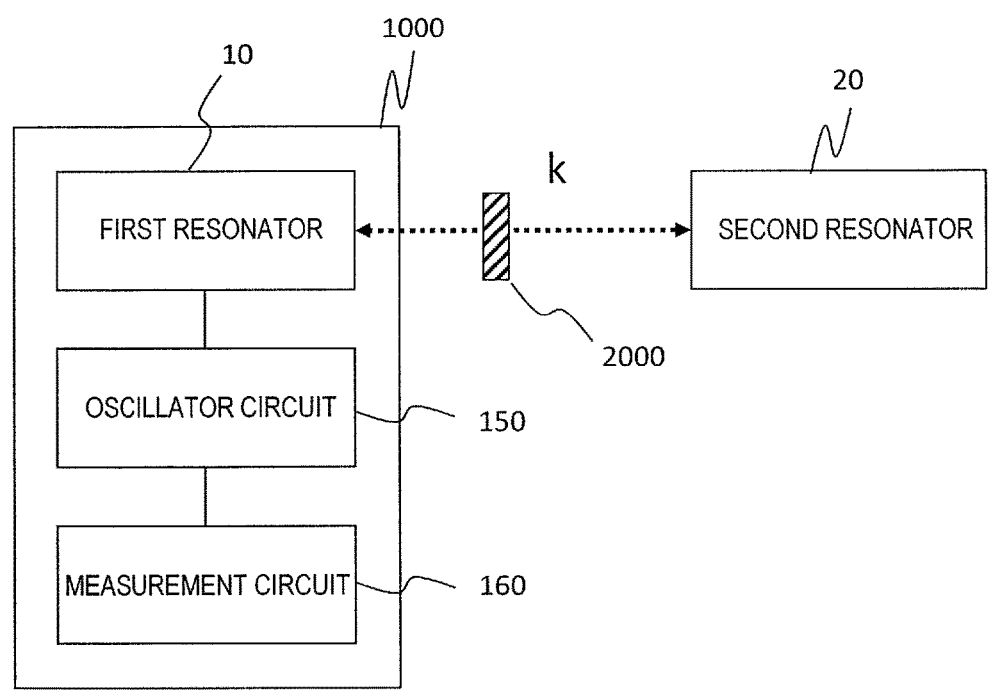
FIG. 1 A block diagram showing the fundamental construction of a non-limiting and illustrative embodiment of a foreign object detector according to the present disclosure.

In outline, embodiments of the present application are as follows.

(1) A foreign object detector according to one implementation of the present disclosure is a foreign object detector for detecting a metallic foreign object between a first resonator and a second resonator which is electromagnetically coupled to the first resonator, the second resonator being composed of a parallel resonant circuit including a coil and a capacitor, the foreign object detector comprising: the first resonator; an oscillator circuit capable of oscillating at a first frequency (f1) which is lower than a resonant frequency (fr) of the second resonator and at a second frequency (f2) which is higher than the resonant frequency (fr); and a measurement circuit to measure changes in input impedance of the first resonator. The measurement circuit is configured to detect a metallic foreign object between the first resonator and the second resonator based on: changes in input impedance of the first resonator as measured by the measurement circuit while the oscillator circuit is oscillating at the first frequency f1; and changes in input impedance of the first resonator as measured by the measurement circuit while the oscillator circuit is oscillating at the second frequency f2.

(2) In one embodiment, the measurement circuit is configured to measure the changes in input impedance by at least measuring an input inductance value of the first resonator, and detects a metallic foreign object between the first resonator and the second resonator based on a ratio between an input inductance value Lin(f1) of the first resonator as measured while the oscillator circuit is oscillating at the first frequency f1 and an input inductance value Lin(f2) of the first resonator as measured by the measurement circuit while the oscillator circuit is oscillating at the second frequency f2.

(3) In one embodiment, the measurement circuit detects a metallic foreign object between the first resonator and the second resonator based on a ratio between the input inductance value Lin(f1) and the input inductance value Lin(f2) after the first resonator has undergone a change in input impedance.

(4) In one embodiment, the measurement circuit detects a metallic foreign object between the first resonator and the second resonator based on a coupling coefficient k which is calculated by the equation $k^2=1-Lin(f2)/Lin(f1)$ or a corrected equation based on this equation.

(5) In one embodiment, the oscillator circuit is a self-excited type oscillator circuit, and is configured so that the input inductance value is in inverse proportion to the square of the oscillation frequency; and the measurement circuit detects a metallic foreign object between the first resonator and the second resonator based on a coupling coefficient k which is calculated by the equation $k^2=1-f1^2/f2^2$ or a corrected equation based on this equation.

(6) One embodiment is configured so that the input inductance value while the coil is short-circuited is identical at both the first frequency f1 and the second frequency f2.

(7) In one embodiment, the measurement circuit is configured to execute a process of determining the presence or absence of a metallic foreign object based on whether or not the input inductance value of the first resonator is equal to or less than a first threshold value.

(8) In one embodiment, the measurement circuit is configured to execute: a process of determining the presence or absence of a metallic foreign object based on whether or not a voltage of the first resonator while the oscillator circuit is oscillating at the first frequency f1 is equal to or less than a second threshold value; and a process of determining the presence or absence of a metallic foreign object based on whether or not a voltage of the first resonator while the oscillator circuit is oscillating at the second frequency f2 is equal to or less than a third threshold value.

(9) In one embodiment, the measurement circuit is configured to measure the changes in input impedance of the first resonator by measuring at least one parameter that changes in accordance with changes in input impedance of the first resonator; and the at least one parameter is a mathematical function of another parameter.

(10) In one embodiment, the first resonator includes a power transmitting coil for use in wireless power transmission; and the foreign object detector further comprises a switch for switching electrical connection between the oscillator circuit and the power transmitting coil, and switches between a power transmission mode for wireless power transmission and a foreign object detection mode by using the switch.

(11) In one embodiment, the first resonator includes a detection coil which is different from a power transmitting coil for use in wireless power transmission; and the measurement circuit detects a metallic foreign object between the first resonator and the second resonator based on a calculated value of a coupling coefficient between the coil of the second resonator and the detection coil.

(12) A power transmitting device according to another implementation of the present disclosure comprises: the foreign object detector of (10) or (11) above; a power transmitting circuit to supply electric power to the power transmitting coil; and a power transmission control circuit to control the power transmitting circuit and the oscillator circuit. The power transmission control circuit is configured to control the power transmitting circuit and adjust a state of power transmission in accordance with a result of measurement by the foreign object detector.

(13) A foreign object detector according to another implementation of the present disclosure is a foreign object detector for detecting a metallic foreign object between a first resonator and a second resonator being electromagnetically coupled. The first resonator is connected to an oscillator circuit capable of oscillating at a first frequency (f1) which is lower than a resonant frequency (fr) of the second resonator and at a second frequency (f2) which is higher than the resonant frequency (fr), and the oscillator circuit is a self-excited type oscillator circuit and configured so that an input inductance value of the first resonator is in inverse proportion to the square of the oscillation frequency. The foreign object detector further comprises: the second resonator being composed of a parallel resonant circuit including a coil and a capacitor; and a measurement circuit to measure a frequency of the second resonator. The measurement circuit detects a metallic foreign object between the first resonator and the second resonator based on a ratio between a frequency f1 as measured by the measurement circuit while the oscillator circuit is oscillating at the first frequency f1 and a frequency f2 as measured by the measurement circuit while the oscillator circuit is oscillating at the second frequency f2.

(14) A foreign object detector according to another implementation of the present disclosure is a foreign object detector for detecting a metallic foreign object between a second resonator and a first resonator which is composed of a parallel resonant circuit including a coil and a capacitor, the second resonator being electromagnetically coupled to the first resonator, the foreign object detector comprising: a second resonator; an oscillator circuit capable of oscillating at a first frequency (f1) which is lower than a resonant frequency (fr) of the first resonator and at a second frequency (f2) which is higher than the resonant frequency (fr); and a measurement circuit to measure changes in input impedance of the second resonator. The measurement circuit detects a metallic foreign object between the second resonator and the first resonator based on: changes in input impedance of the second resonator as measured by the measurement circuit while the oscillator circuit is oscillating at the first frequency f1; and changes in input impedance of the second resonator as measured by the measurement circuit while the oscillator circuit is oscillating at the second frequency f2.

(15) In one embodiment, the measurement circuit is configured to measure the changes in input impedance by at least measuring an input inductance value of the second resonator, and detects a metallic foreign object between the first resonator and the second resonator based on changes in a ratio between an input inductance value of the second resonator Lin(f1) as measured while the oscillator circuit is oscillating at the first frequency f1 and an input inductance value Lin(f2) of the second resonator as measured by the measurement circuit while the oscillator circuit is oscillating at the second frequency f2.

(16) In one embodiment, the measurement circuit detects a metallic foreign object between the first resonator and the second resonator based on a ratio between the input inductance value Lin(f1) and the input inductance value Lin(f2) after the second resonator has undergone a change in input impedance.

(17) In one embodiment, the measurement circuit detects a metallic foreign object between the first resonator and the second resonator based on a coupling coefficient k which is calculated by the equation $k^2=1-Lin(f2)/Lin(f1)$ or a corrected equation based on this equation.

(18) In one embodiment, the oscillator circuit is a self-excited type oscillator circuit, and is configured so that the input inductance value is in inverse proportion to the square of the oscillation frequency; and the measurement circuit detects a metallic foreign object between the first resonator and the second resonator based on a coupling coefficient k which is calculated by the equation $k^2=1-f1^2/f2^2$ or a corrected equation based on this equation.

(19) A power receiving device according to another implementation of the present disclosure comprises: the foreign object detector of any of (13) to (18) above; and a power receiving circuit to supply electric power to a load, the electric power having been received by the second resonator from the first resonator via wireless power transmission.

(20) A wireless power transmission system according to another implementation of the present disclosure comprises at least one of the power transmitting device of (12) above and the power receiving device of (19) above.

Prior to describing specific embodiments of the present disclosure, the fundamental construction of a foreign object detector according to the present disclosure will be described. First, FIG. 1 is referred to. FIG. 1 is a block diagram showing the fundamental construction of a non-limiting and illustrative embodiment of a foreign object detector according to the present disclosure.

The foreign object detector 1000 illustrated in FIG. 1 is an apparatus for detecting a metallic foreign object 2000 between a first resonator 10 and a second resonator 20 which is composed of a parallel resonant circuit including a coil and a capacitor. As used herein, "between the first resonator 10 and the second resonator 20" means the entire region across which a magnetic field is created when the first resonator 10 and the second resonator 20 are electromagnetically coupled. Therefore, without being limited to the case shown in FIG. 1 where the metallic foreign object 2000 is located on a line segment that connects the first resonator 10 and the second resonator 20, any metallic foreign object 2000 whose position is off that line segment is also subject to detection. The foreign object detector 1000 includes the first resonator 10, an oscillator circuit 150 connected to the first resonator 10, and a measurement circuit 160 connected to the oscillator circuit 150.

The oscillator circuit 150 is configured to oscillate at a first frequency (f1) which is lower than the resonant frequency (fr) of the second resonator 20 and at a second frequency (f2) which is higher than the resonant frequency (fr). The measurement circuit 160 is configured to measure changes in input impedance of the first resonator 10. The measurement circuit 160 is configured to detect a metallic foreign object 2000 between the first resonator 10 and the second resonator 20, based on: changes in input impedance of the first resonator 10 as measured by the measurement circuit 160 while the oscillator circuit 150 is oscillating at the first frequency f1; and changes in input impedance of the first resonator 10 as measured by the measurement circuit 160 while the oscillator circuit 150 is oscillating at the second frequency f2.

As used herein, a "change in input impedance" of a resonator means, where two resonators are electromagnetically coupled, a change from a reference value which is defined as an input impedance of the case where the metallic foreign object 2000 is sufficiently distant from the resonator. A change in input impedance of a resonator can be detected by, for example, measuring a parameter of that resonator which changes with changes in input impedance, e.g., the input inductance value, voltage, Q factor, current, and resistance value. Therefore, in the present specification, measuring "changes in input impedance" encompasses measuring changes in at least one of the aforementioned parameters.

As will be described later in detail, the measurement circuit 160 may be configured to measure an input inductance value of the first resonator 10, as an instance of input impedance measurement of the first resonator 10. In that case, the measurement circuit 160 may be configured to detect a metallic foreign object 2000 between the first resonator 10 and the second resonator 20 based on a ratio between an input inductance value Lin(f1) of the first resonator 10 as measured by the measurement circuit 160 while the oscillator circuit 150 is oscillating at the first frequency f1 and an input inductance value Lin(f2) of the first resonator 10 as measured by the measurement circuit 160 while the oscillator circuit 150 is oscillating at the second frequency f2. In one example, a coupling coefficient k between the first resonator 10 and the second resonator 20 can be calculated or estimated by using Lin(f1)/Lin(f2), which is a ratio of the input inductance values. The coupling coefficient k undergoes changes which are dependent on a metallic foreign object between the first resonator 10 and the second resonator 20. For example, if a metallic foreign object that completely intercepts a magnetic field exists between the coils and the first resonator 10 and the second resonator 20 are not electromagnetically coupled, the coupling coefficient k is zero or has a small value which approximates zero. On the other hand, if no metallic foreign object exists between the coils, the coupling coefficient k has a value which is greater than zero but not more than 1. Therefore, the presence or absence of a metallic foreign object between the first resonator 10 and the second resonator 20 can be determined based on a calculated value or estimated value of the coupling coefficient k.

A foreign object detector of such an example is characterized by its use of a ratio between two input inductance values which are obtained at different frequencies, i.e., Lin(f1)/Lin(f2). In the present disclosure, measuring an input inductance value of the first resonator encompasses not only directly measuring any such input inductance value, but also measure another physical parameter into which the input inductance value is converted. Under some circumstances, the frequency of an electromagnetic field which electromagnetically couples the first resonator 10 and the second resonator 20 is in proportion to the input inductance value (e.g., a voltage-to-frequency converter). Under other circumstances, the frequency of an electromagnetic field which electromagnetically couples the first resonator 10 and the second resonator 20 is in inverse proportion to a square of the input inductance value (e.g., oscillation frequency of a self-excited type oscillator circuit). Therefore, by measuring the frequency of an AC current or an AC voltage flowing in the first resonator 10 or the second resonator 20, in effect, "an input inductance value of the first resonator" can be measured. This consequently allows a value of the coupling coefficient k to be acquired.

Figure 2:
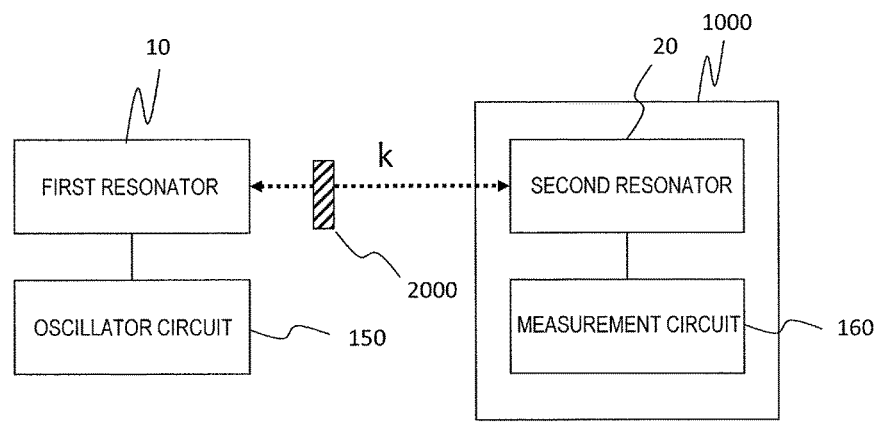
FIG. 2 A diagram showing an exemplary construction in which a measurement circuit is connected to a second resonator and an oscillator is connected to a first resonator.
Figure 3:
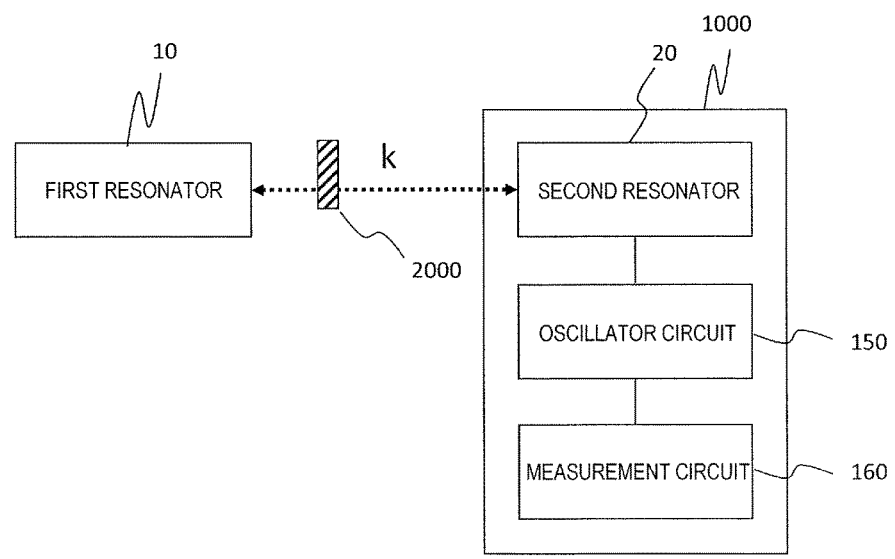
FIG. 3 A diagram showing an exemplary construction in which both an oscillator circuit and a measurement circuit are connected to a second resonator.

Next, with reference to FIG. 2 and FIG. 3, exemplary constructions in which the foreign object detector 1000 includes the second resonator 20 will be described. In the example of FIG. 2, the measurement circuit 160 is connected to the second resonator 20, whereas the oscillator 150 is connected to the first resonator 10. In the example of FIG. 3, both the oscillator circuit 150 and the measurement circuit 160 are connected to the second resonator 20. In these examples, the second resonator 20 is included in the foreign object detector 1000, and the second resonator 20 moves as the foreign object detector 1000 is moved.

Figure 4:
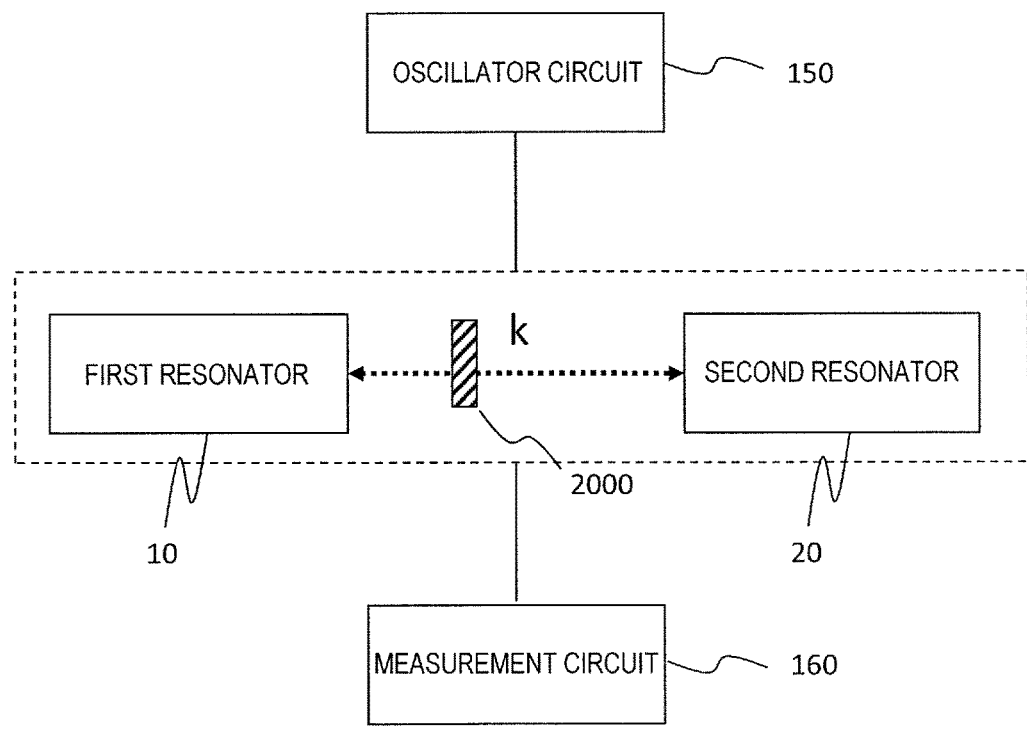
FIG. 4 A diagram for explaining a fundamental operation of a foreign object detector according to the present disclosure.

Next, with reference to FIG. 4, a fundamental operation of the foreign object detector according to the present disclosure will be described. As was described earlier, the oscillator circuit 150 may be connected to either one of the first resonator 10 and the second resonator 20, or provided in both, so long as vibration of an electric field or a magnetic field for achieving the electromagnetic coupling between the first resonator 10 and the second resonator 20 can be created at frequencies f1 and f2. Moreover, so long as the first resonator 10 and the second resonator 20 are electromagnetically coupled, the measurement circuit 160 may be connected to either one of the first resonator 10 and the second resonator 20 and still a foreign object can be detected based on changes in input impedance of the first resonator 10 or the second resonator 20. In one embodiment, an input inductance value of the first resonator 10, or an input inductance value of the second resonator 10 are directly or indirectly measured, whereby the coupling coefficient k can be detected.

The foreign object detector according to the present disclosure can be constructed by utilized at least some of the constituent elements of a power transmitting device and a power receiving device which are used in a wireless power transmission system. In that case, the foreign object detector is used in a form incorporated in the power transmitting device or the power receiving device in the wireless power transmission system. Without being limited to such a construction, a foreign object detector may be used alone by itself to detect a foreign object.

Hereinafter, with reference to the drawings, embodiments of the present disclosure will be described in detail. Like constituent elements are denoted by like numerals.

Embodiment 1

Figure 5:
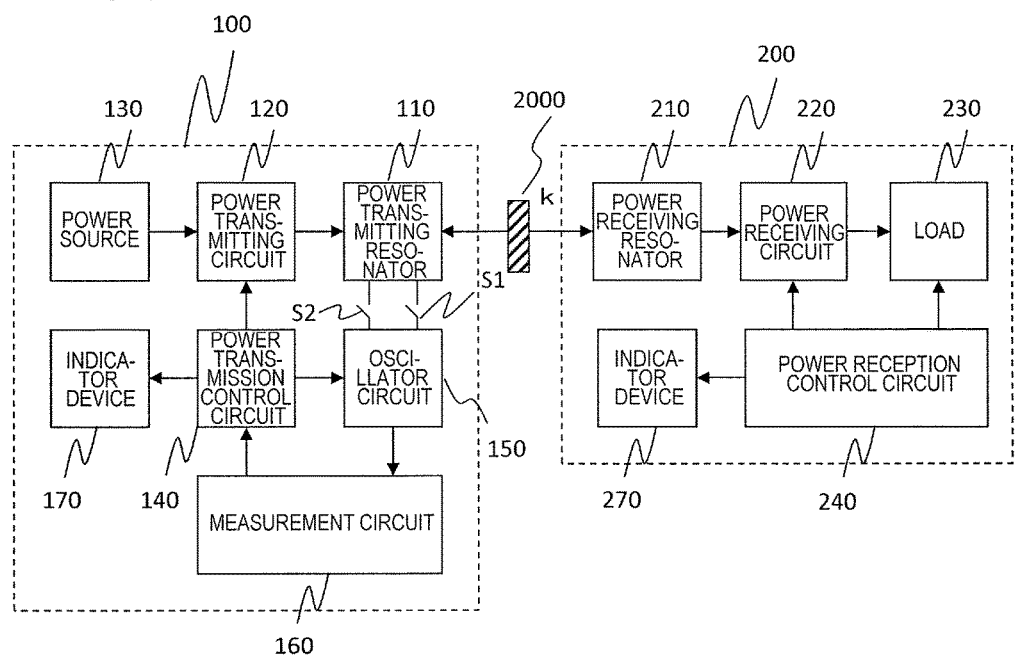
FIG. 5 A block diagram showing a schematic construction of a wireless power transmission system according to Embodiment 1.

FIG. 5 is a block diagram showing the schematic construction of a wireless power transmission system according to a first embodiment of the present disclosure. This wireless power transmission system includes a power transmitting device 100 and a power receiving device 200, and is able to wirelessly transmit electric power from the power transmitting device 100 to the power receiving device 200. The power transmitting device 100 may be a wireless charger, for example, and the power receiving device 200 may be a device having a secondary battery, such as a personal digital assistant or an electric vehicle, for example. In the present embodiment, it is the power transmitting device 100 that the aforementioned foreign object detector is provided in.

Therefore, the power transmitting device 100 not only transmits power to the power receiving device 200, but also is able to detect whether or not a metallic foreign object 2000 exists between a power receiving resonator 210 in the power receiving device 200 and a power transmitting resonator 110. In the present specification, this detection is referred to as "foreign object detection". A user is notified of the detection result in the form of light, video, voice, or other information from an indicator device 170 or an indicator device 270, e.g., a light source, a display, or a loudspeaker, that is provided in the power transmitting device 100 or the power receiving device 200, for example. In the present specification, an "indicator device" is not limited to a device which presents visual information, but also broadly encompasses a device which exclusively presents aural information (sound or voice).

With this function of the foreign object detector included which is in the wireless power transmission system of the present embodiment, a user who brings the power receiving device 200 near the power transmitting device 100 is able to know whether a foreign object exists between the power receiving resonator 210 and the power transmitting resonator 110 or not, thereby ensuring a safe state of transmission. Thus, the power transmitting device 100 operates in the two modes of: a "foreign object detection mode" where it detects a foreign object by using the foreign object detector; and a "power transmission mode" where it performs power transmission by using the power transmitting circuit 120.

As shown in FIG. 5, the power transmitting device 100 of the present embodiment includes a power transmitting resonator 110, a power transmitting circuit 120, a power source 130, an oscillator circuit 150, a measurement circuit 160, and an indicator device 170. Among these constituent elements, the power transmitting resonator 110, the oscillator circuit 150, and the measurement circuit 160 define a foreign object detector. Hereinafter, the construction and operation of the foreign object detector will be described.

As will be later described in detail with reference to FIG. 8, the power transmitting resonator 110 is a resonant circuit (first resonator) including a power transmitting coil L1 and a capacitor C1 which is connected in series to the power transmitting coil L1. The resonation state of the power transmitting resonator 110 is controlled by the oscillator circuit 150. In the present embodiment, the first resonator for foreign object detection purposes also doubles as a power transmitting resonator in wireless power transmission.

The oscillator circuit 150 is connected to the power transmitting resonator 110, and is able to oscillate at two frequencies which are different from the resonant frequency fr of the power receiving resonator 210. These two frequencies are prescribed to be a first frequency f1 which is lower than the resonant frequency fr and a second frequency f2 which is higher than the resonant frequency fr. The first frequency f1 may be set to e.g. 85% or less of the resonant frequency fr, while the second frequency f2 may be set to e.g. 115% or more of the resonant frequency fr. Note that, under the power transmission mode, AC energy with the resonant frequency fr of the power receiving resonator 210 included in the power receiving device 200 is to be transmitted from the power transmitting resonator 110 to the power receiving resonator 210. The frequency under the power transmission mode does not need to be completely equal to the resonant frequency fr of the power receiving resonator 210, but may be set to a value in the range of about 85 to 115% of the resonant frequency fr, for example. Moreover, the frequency under the power transmission mode does not need to be set in the aforementioned frequency band, and a different frequency band may instead be used. For example, the power transmission may be in a frequency band of 100 kHz to 200 kHz, while the resonant frequency for foreign object detection purposes may be set to fr=1000 kHz. The details will be described later with reference to FIG. 8.

The measurement circuit 160 detects a foreign object between the power transmitting resonator 110 and the power receiving resonator 210 by detecting changes in frequency (oscillation frequency), and changes in voltage, of the AC energy which is output from the oscillator circuit 150. In other words, the measurement circuit 160 first measures an inductance value Lin(f1) of the power transmitting resonator 110 while the oscillator circuit 150 is oscillating at the first frequency f1. Also, the measurement circuit 150 measures an inductance value Lin(f2) of the power transmitting resonator 110 while the oscillator circuit 150 is oscillating at the second frequency f2. Then, the measurement circuit 160 detects a metallic foreign object between the power transmitting resonator 110 and the power receiving resonator 210 based on a ratio between the two inductance values and voltage values, according to the principles described below.

Next, the power receiving device 200 will be briefly described. The power receiving device 200 includes the power receiving resonator 210, a power receiving circuit 220, a load 230, and an indicator device 270. As will be described later in detail, the power receiving resonator 210 is a resonant circuit (second resonant circuit) including a power receiving coil L2 and a capacitor C2 which is connected in parallel to the power receiving coil L2, with a resonant frequency being set to a predetermined value fr. The AC energy which the power receiving resonator 210 receives via a space from the power transmitting resonator 110 in a non-contacting manner has its waveform converted by the power receiving circuit 220, and is supplied to the load 230.

Figure 6:
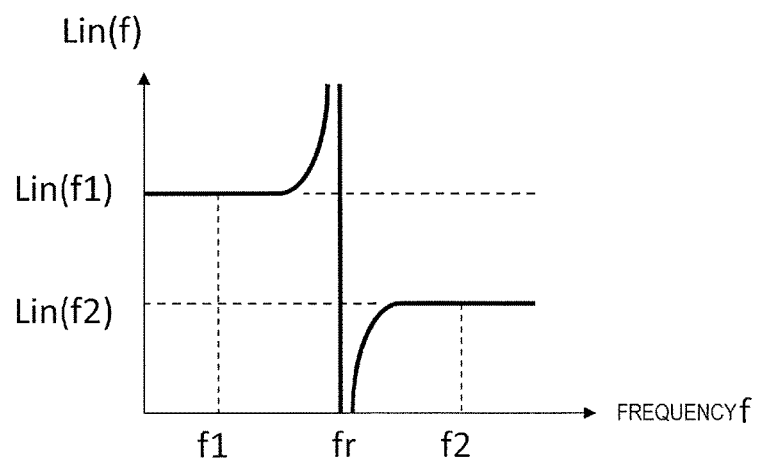
FIG. 6 A diagram for explaining operation principles of the wireless power transmission system according to Embodiment 1.

FIG. 6 is a diagram for explaining operation principles of a method of coupling coefficient estimation which is used for the foreign object detection according to the present embodiment. Herein, a method of estimating a coupling coefficient for a pair of coils will be described.

When a power transmitting coil L1 (whose inductance value is also denoted as L1) and a power receiving coil L2 (whose inductance value is also denoted as L2) which resonates at a frequency fr are electromagnetically coupled via a coupling coefficient k, an input inductance Lin as viewed from the power transmitting coil is determined by the following equation.

$$Lin(f) = L1\{1 - k^2/(1 - (fr/f)^2)\} \qquad \text{eq. 1}$$

FIG. 6 is a graph schematically representing eq. 1.

At a frequency f<<fr, both ends of the power receiving resonator 210 would appear substantially open. An input inductance value which is measured at a first frequency f1 which is lower than fr is designated Lin(f1). On the other hand, at a frequency f>>fr, both ends of the parallel capacitor in the power receiving resonator 210 would appear substantially short-circuited. An input inductance value which is measured at a second frequency f2 which is higher than fr is designated Lin(f2).

When f1 and f2 are set to appropriate magnitudes, the following approximate equation is derived from eq. 1.

$$Lin(f1) \approx L1$$

$$Lin(f2) \approx L1(1-k^2)$$

From these two approximate equations, eq. 2 is below is obtained.

$$k^2 \approx 1 - Lin(f2)/Lin(f1) \qquad \text{eq. 2}$$

According to this eq. 2, the coupling coefficient k can be calculated based on a ratio between the measured values Lin(f1) and Lin(f2). However, eq. 2 is based on a special condition where the relationships of eqs. 3 and 4 below hold true between an input inductance Lin_open(f) of the case where the ends of the power receiving coil are completely open and an input inductance Lin_short(f) of the case where the ends of the power receiving coil are completely short-circuited.

$$Lin\_open(f1) = Lin\_open(f2) \qquad \text{eq. 3}$$

$$Lin\_short(f1) = Lin\_short(f2) \qquad \text{eq. 4}$$

Stated conversely, when the wireless power transmission system is designed by choosing appropriate frequencies f1 and f2 that satisfy eqs. 3 and 4, then eq. 2 will be satisfied, thus enabling estimation of the coupling coefficient k. Usually, there will be no practical problem if these frequencies f1 and f2 are set in frequency ranges such that the resonator dimensions can be regarded as sufficiently small relative to their wavelengths.

Note that, when a self-excited type oscillator circuit is used, changes in input inductance can be directly converted into changes in oscillation frequency. That is, since an input inductance is determined by an inverse of the square of the oscillation frequency, the coupling coefficient k can be reexpressed into the following equation.

$$k^2 \approx 1 - f1^2/f2^2 \qquad \text{eq. 5}$$

In practice, eq. 2 and eq. 5 need correction because of including linear and non-linear elements, etc., of the circuit; however, principle-wise, the coupling coefficient k is still estimable from these equations (the details of an example of correction will be described later with reference to FIG. 8).

From the above, while sequentially switching between the operations of oscillating at the frequencies f1 and f2, input inductance values or oscillation frequencies may be measured at these two frequencies, whereby the coupling coefficient k can be estimated from the results of measurement. The coupling coefficient k changes in accordance with how the magnetic field is intercepted by a metallic foreign object between the power transmitting and power receiving coils; therefore, when an estimated coupling coefficient k becomes equal to or less than a predetermined threshold value, for example, it can be assumed that a metallic foreign object exists between the power receiving coil and the power transmitting coil. When foreign object detection is completed, the power transmitting device 100 begins power transmission by using the power transmitting circuit 120 instead of the oscillator circuit 150. As a result, electric power can be wirelessly supplied to the power receiving device 200 in a safe and highly efficient manner.

Next, details of the respective elements shown in FIG. 5 will be described.

The foreign object detector according to the present embodiment includes: the measurement circuit 160 which measures electrical characteristics (input inductance, oscillation frequency, and any parameter that undergoes changes which are dependent thereon) of the first resonator (power transmitting resonator) 110; and the oscillator circuit 150 which is able to oscillate at two frequencies which are different from the resonant frequency of the second resonator (power receiving resonator).

The power transmitting resonator 110 includes the coil L1 and the capacitor C1. As the coil L1, a planar coil of a thin profile which is made in a substrate pattern, a wound coil in which a copper wire, a litz wire, a twisted wire or the like is used, and so on, can be used. In order to obtain adequate detection sensitivity, the Q factor of the coil L1 may be set to 100 or more, for example, but may be set to a value which is smaller than 100. Unless needed, the capacitor C1 may not be included, in which case the power transmitting resonator 110 may be established on the strength of the self-resonance characteristics of the coil L1 itself.

The power transmitting circuit 120 is a circuit which, after foreign object detection is finished, outputs AC energy for power transmission. The power transmitting circuit 120 may be a full-bridge type inverter, or any other type of power transmitting circuit, e.g., class D or class E. Moreover, modulation/demodulation circuits for communications and various sensors for measuring a voltage, current, or the like may also be included.

The power source 130 encompasses mains supply, a primary battery, a secondary battery, a photovoltaic cell, a fuel cell, a USB (Universal Serial Bus) power source, a high-capacitance capacitor (e.g., an electric double-layer capacitor), a voltage converter connected to the mains supply, and any power source that can be implemented by using a combination thereof.

The power transmission control circuit 140 is a processor which controls the operation of the entire power transmitting device 100, and may be implemented by a combination of a CPU and a memory in which a computer program is stored, for example. The power transmission control circuit 140 may be dedicated hardware which is configured to realize the operation according to the present embodiment. The power transmission control circuit 140 switches the oscillation frequency of the oscillator circuit 150, controls power transmission by the power transmitting circuit 120 (adjustment of the state of power transmission), and performs control to activate the indicator device 170 based on a result of detection by the measurement circuit 160. Specifically, under the foreign object detection mode, it stops the power transmitting circuit 120 from operating, and drives the oscillator circuit 150. Under the power transmission mode, it stops the oscillator circuit 150 from operating, and drives the power transmitting circuit 120. In accordance with the results of measurement by the foreign object detector, the power transmission control circuit 140 determines a beginning frequency of power transmission and a voltage of power transmission.

As the oscillator circuit 150, for example, known self-excited type oscillator circuits that are based on the LC resonance principle can be used, e.g., a Colpitts oscillator circuit, a Hartley oscillator circuit, a Clapp oscillator circuit, a Franklin oscillator circuit, or a Pierce oscillator circuit. The present embodiment is characterized in that changes in impedance of the coil L1 are translated into changes in frequency so as to be highly accurately detected; therefore, so long as such detection is possible, any other oscillator circuit and any other circuit topology may be used without being limited to the above. In the case where there is a possibility of burnout of the oscillator circuit 150 during power transmission, a switch may be provided between the power transmitting resonator 110 and the oscillator circuit 150 to electrically interrupt between them during power transmission. In the case where eq. 2 is used for determining the coupling coefficient k, the oscillator circuit 150 and the power transmitting circuit 120 are identical in function; therefore, the circuits 150 and 120 may be made into one common entity.

The measurement circuit 160 is used in order to measure the aforementioned oscillation frequency and measure the voltage and/or current of the power transmitting coil L1 for calculating an input inductance. Although not shown, at least some of the functions of the measurement circuit 160 and at least some of the functions of the power transmission control circuit 140 may be realized by a semiconductor package (e.g., a microcontroller or a custom IC).

The indicator device 170 is configured to notify the user of a result of detection by the measurement circuit 160. The indicator device 170 is configured to function as an "indicator" indicating the presence or absence (or closeness) of a metallic foreign object between the power transmitting resonator 110 and the power receiving resonator 210. The indicator device 140 can be composed of a light source such as an LED or an organic EL. Alternatively, it may be a congregation of plural light sources. Depending on the distance between the power transmitting coil L1 and the power receiving coil L2 or the closeness of the metallic foreign object, the indicator device 170 may activate different ones of a plurality of light sources, or vary the number of light sources to be activated in stepwise manners. Moreover, the indicator device 170 may be a display such as a liquid crystal indicator device or an organic EL indicator device. When using a display, the detection result can be indicated in the form of an image or text, etc. The indicator device 170 may be configured to indicate the detection result in the form of a sound or voice, in addition to or instead of light.

Next, constituent elements of the power receiving device 200 will be described.

The power receiving resonator 210 includes the power receiving coil L2 and the capacitor C2. The power receiving coil L2 and the capacitor C2 may respectively be similar to or different from the power transmitting coil L1 and the capacitor C1 in the power transmitting resonator 110. What is important is for the impedance $Z2=1/j\omega C2$ to be set so that it is relatively large at the frequency f1 and relatively small at the frequency f2. Herein, j is the imaginary unit, and co is an angular frequency, such that the relationship of $\omega=2\pi \times$ frequency holds true.

A serial capacitor may be inserted between the power receiving resonator 210 and the power receiving circuit 220. Unless necessary, the power receiving resonator 210 may not include the capacitor C2, in which case the power receiving resonator 210 may be established on the strength of the self-resonance characteristics of the coil L2 itself.

The power receiving circuit 220 includes various circuits such as a rectifier circuit, a frequency conversion circuit, a constant voltage/constant current control circuit, and a modulation/demodulation circuit for communications, and is configured to convert received AC energy into DC energy or low-frequency AC energy which is of use to the load 230. Moreover, various sensors for measuring the voltage, current, or the like of the power receiving resonator 210 may also be included in the power receiving circuit 220.

The load 230 is a secondary battery or a high-capacitance capacitor, for example, which may be charged by or fed with electric power which is output from the power receiving circuit 220.

The power reception control circuit 240 in the present embodiment is a processor which controls the operation of the entire power receiving device 200, and may be implemented by a combination of a CPU and a memory in which a computer program is stored, for example. Without being limited to this example, the power reception control circuit 240 may be dedicated hardware which is configured to realize the operation according to the present embodiment. The power reception control circuit 240 performs control of power charging/feeding for the load 250, and control of the indicator device 270.

The oscillation frequency in the present embodiment may be set in a low frequency range from 20 kHz to 20 MHz, in which the parallel capacitor C2 may well be seen as a lumped parameter circuit element. A higher frequency provides a higher resolution and thus more rapid detection of a foreign object. Therefore, when detection is occur with a period of 10 μsec or less, the oscillation frequency may be set to an inverse thereof, i.e., 100 kHz to 100 MHz. If it is acceptable to be slow, it may be set to several kHz to 100 kHz.

Next, an operation of the wireless power transmission system of the present embodiment will be described with reference to the flowchart of FIG. 7.

First, when the power transmitting device 100 senses nearing of the power receiving resonator 210 to the power transmitting resonator 110, the foreign object detection mode is started. In the present embodiment, this sensing of "nearing" is not based on the aforementioned operation principles of the foreign object detector, but may be achieved by detecting a change in oscillation frequency or voltage, for example. When the power receiving resonator 210 comes near the power transmitting resonator 210, the oscillation frequency may increase, or the amplitude of the voltage which is output from the oscillator circuit 150 may decrease, under the influences of metals (substrate grounding, coils, etc.) inside the power receiving resonator 210. Moreover, in the case where the power receiving coil L2 in the power receiving resonator 210 includes an electromagnetic shield (magnetic substance) for reducing the influence of electromagnetic noise on neighboring circuits, the oscillation frequency may decrease with nearing of the power receiving resonator 210. Therefore, by detecting a change in oscillation frequency or voltage, it is possible to sense nearing of the power receiving resonator 210. The power transmission control circuit 140 and the oscillator circuit 150 may be configured to perform intermittent oscillations (intermittent operation) of oscillating several periods of AC current once in every 1 millisecond to several seconds, for example, and switch to a continuous operation only upon sensing a nearing of the power receiving coil L2. Through such an intermittent operation, it is possible to sense nearing of the power receiving coil L2 while suppressing an increase in power consumption. The operating frequency of the oscillator circuit 150 in this intermittent operation may be f1 or any other frequency.

Next, at step S600, the power transmission control circuit 140 operates the oscillator circuit 150 at the frequency f1.

At step S601, after the lapse of a predetermined time, the measurement circuit 160 measures an input inductance and voltage. This is equivalent to the aforementioned measurement of an input impedance.

At step S602, the power transmission control circuit 140 operates the oscillator circuit 150 at the frequency f2.

At step S603, after the lapse of a predetermined time, the measurement circuit 160 measures an input inductance and voltage.

From the results of these measurements, a coupling coefficient is calculated according to eq. 2 (step S604), and it is determined at step S605 whether the coupling coefficient k and the voltage has exceeded a predetermined first threshold value or not. The first threshold value may be set to a value in the range from 0.3 to 0.5, for example. If the calculated coupling coefficient k exceeds the predetermined first threshold value, it can be determined that no foreign object exists between the power receiving coil L2 and the power transmitting coil L1, and therefore the measurement circuit 160 sends information indicating this to the power transmission control circuit 140. Upon receiving this information, the power transmission control circuit 140 stops the oscillator circuit 150 from oscillating (step S606). At this time, the power transmission control circuit 140 may activate the indicator device 170, or indicate on the indicator device 270 that power transmission is to begin. As a result, the user can be notified that no foreign object exists between the coils and that charging can safely take place. When the power transmission control circuit 140 has this notification function, it means that the power transmission control circuit 140 functions as a "light-source control circuit" or an "indication control circuit".

Thereafter, the power transmission control circuit 140 drives the power transmitting circuit 120 to begin wireless power transmission. Note that, instead of immediately after the oscillator circuit 150 is stopped from oscillating, beginning of wireless power transmission may take place after e.g. the user places the power receiving device 200 on the power transmitting device 100 and it is confirmed that fluctuations in frequency have ceased.

On the other hand, at step S605, if the coupling coefficient k does not exceed the predetermined first threshold value, the indicator device 170 may be flickered, or it may be indicated on the indicator device 270 that a foreign object exists. As a result, the user can be notified that a foreign object exists between the coils and that it would be dangerous to transmit power.

The coupling coefficient k is calculated according to eq. 2 herein; however, it may be calculated according to eq. 5.

Through the above operation, the foreign object detector in the power transmitting device 100 according to the present embodiment is able to detect a metallic foreign object between itself and the power receiving coil L2 in the power receiving device 200, and output information indicating this. This allows the user to know whether it is possible to safely perform power transmission or not.

Figure 7:
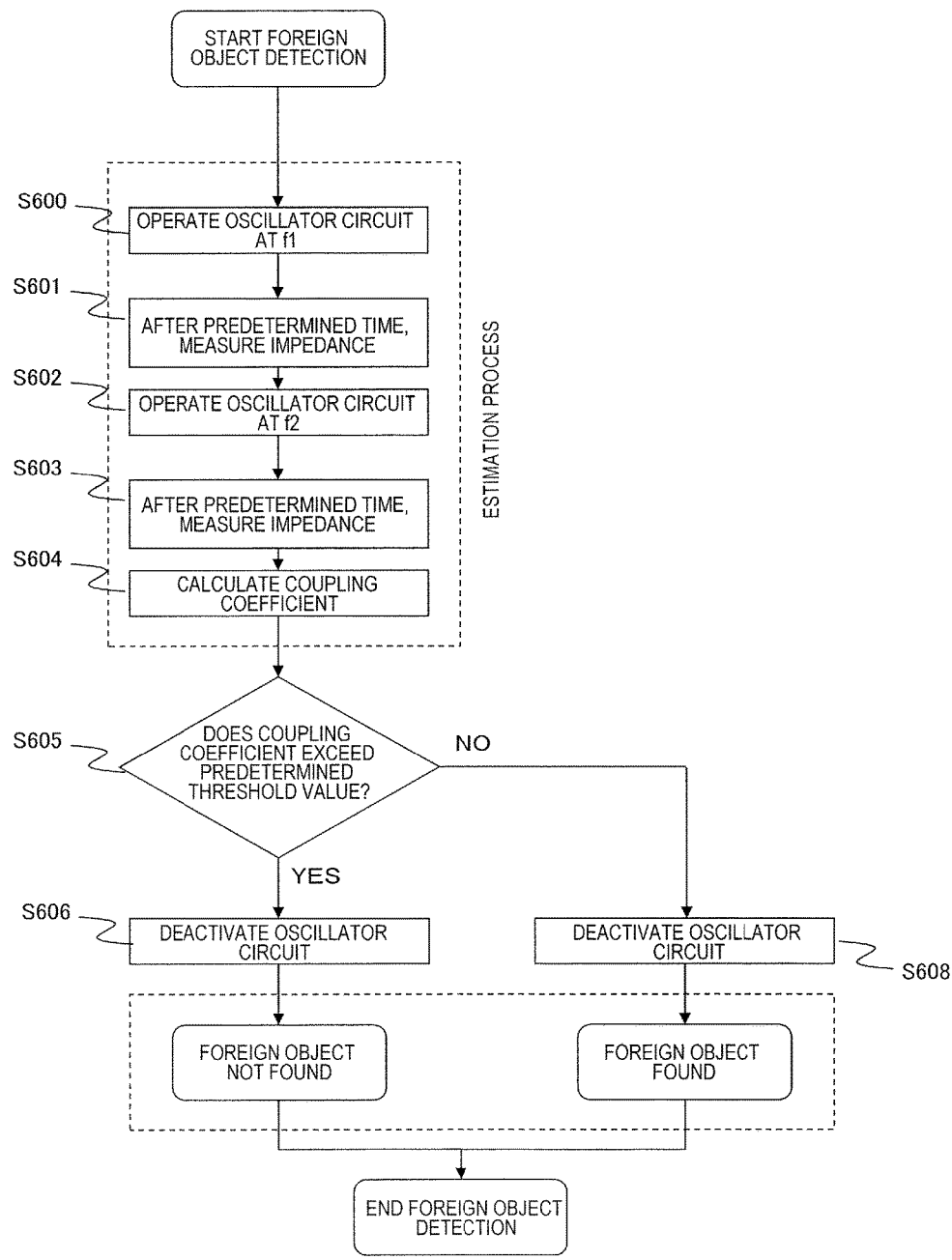
FIG. 7 A flowchart showing a foreign object detection operation of a wireless power transmission apparatus according to Embodiment 1.

Note that the operation according to the present embodiment is not limited to the operation shown in FIG. 7. For example, not only by evaluating the determination process of step S605 in terms of an absolute quantity as to whether a predetermined coupling coefficient k is exceed or not, but detection may also be performed based on whether an amount of change of the coupling coefficient k over time has become sufficiently small or not.

(Exemplary Circuit Construction for Embodiment 1)

Figure 8:
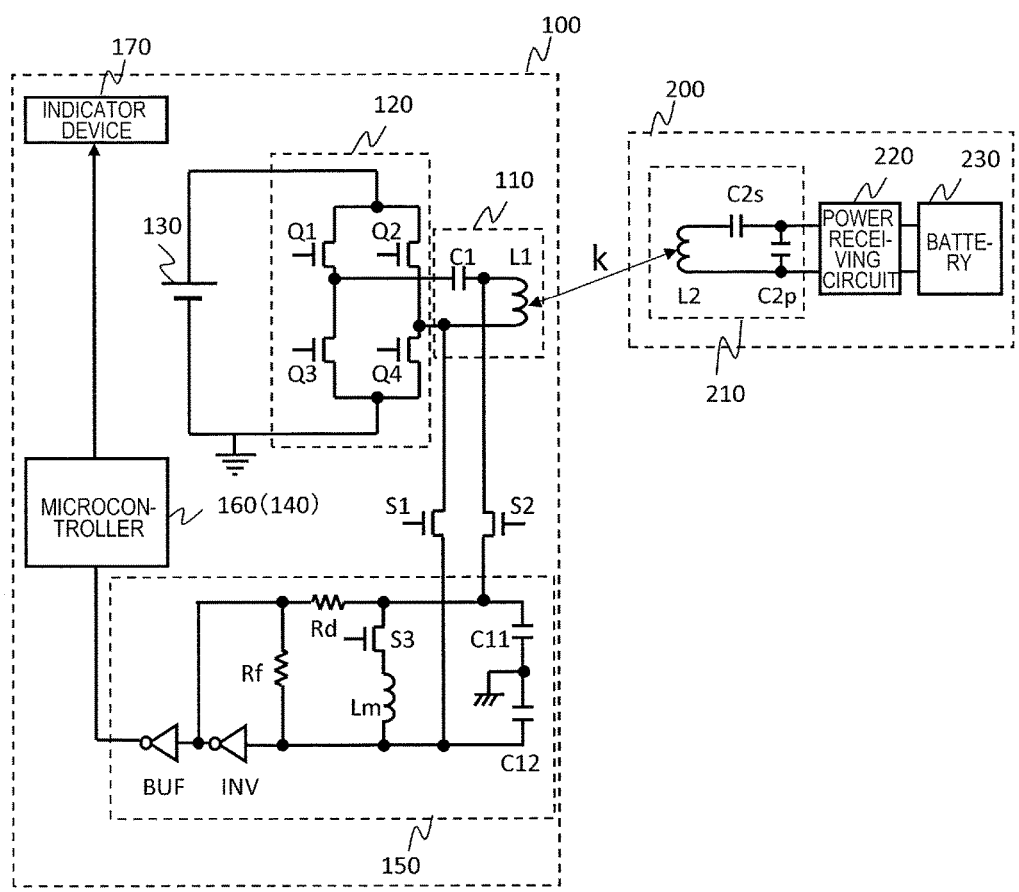
FIG. 8 A diagram showing an exemplary specific circuit construction of the wireless power transmission system according to Embodiment 1.

FIG. 8 is a diagram showing an exemplary circuit construction of the wireless power transmission system according to Embodiment 1 of the present disclosure.

The power transmitting resonator 110 includes a power transmitting coil L1, and a capacitor C1 which is connected in series to the power transmitting coil L1. On the other hand, the power receiving resonator 210 includes a power receiving coil L2, a capacitor C2p which is connected in parallel to the power receiving coil L2, and a capacitor C2s which is connected in series to the power receiving coil L2.

In this Example, the power transmitting coil L1 has an outer shape of 39 mm, with its inductance being set to L1=13.6 µH. The power receiving coil L2 has an outer shape of 34 mm, with its inductance being set to L2=15.8 µH. The capacitance of the serial capacitor C1 is set to 180 nF, whereas the capacitances of the serial capacitor C2s and the parallel capacitor C2p are set to C2s=120 nF and C2p=1590 pF, respectively. The power transmitting coil L1 resonates at 100 kHz, whereas the power receiving coil L2 resonates at 115 kHz and 1000 kHz.

The power transmitting coil L1 is connected to the oscillator circuit 150 via switches S1 and S2. The oscillator circuit 150 according to this Example is a Pierce oscillator circuit which functions as a self-excited type LC oscillator circuit. The resistor Rf and the resistor Rd included in the oscillator circuit 150 are elements for adjusting the excitation level of the circuit. The oscillator circuit 150 further includes an adjustment inductor Lm and a switch S3 for altering the oscillation frequency. The values of Lm and C11 and C12 are determined so that oscillation will occur at two frequencies that are different from the resonant frequencies fr=115 kHz and fr=1000 kHz of the power receiving coil, namely, f1=400 kHz (S1 and S2 being ON, and S3 being OFF) and f2=1500 kHz (S1 and S2 being ON, and S3 being ON). Since C1 and C2s would appear short-circuited at f1 and f2 and C2p would appear open at f1 but short-circuited at f2, the capacitor that is mainly involved in the coupling coefficient estimation can be considered to be C2p. Note that the following equation (eq. 6), into which eq. 5 has been corrected, is adopted as an estimation formula for the coupling coefficient according to this Example.

$$k2 \approx 1 - f1^2/(f2^2 - f3^2) \qquad \text{eq. 6}$$

The oscillation frequency f3 is an oscillation frequency in the case where S1 and S2 are turned OFF with S3 being turned ON. In other words, measuring the frequency f3 is equivalent to measuring an inductance value of the adjustment inductor Lm. When the power transmitting coil L1 is oscillating at the frequency f2, this oscillation frequency includes a component based on the input inductance value of the power transmitting coil L1 and a component based on the inductance value of the adjustment inductor Lm. Therefore, the coupling coefficient calculation in eq. 6 is performed by eliminating the influence of the adjustment inductor Lm from the denominator of the second term. Thus, the measurement circuit 160 may detect a foreign object based on a coupling coefficient k that is calculated according to, instead of eq. 5, the corrected equation 6 which is based on eq. 5. Since various circuit topologies are available for a self-excited type LC oscillator circuit as mentioned earlier, the corrected equation is not limited to eq. 6 (for example, a method of altering the oscillation frequency by changing the capacitors C11 and C12 in FIG. 8 to different capacitors might be possible). Even when adopting a different circuit topology, one skilled in the art should be easily able to derive a corrected equation from eq. 5. Similarly, in the case of using eq. 2, too, the coupling coefficient k may be calculated by using a corrected equation obtained by correcting eq. 2 in accordance with the circuit topology.

Embodiment 2

Figure 9:
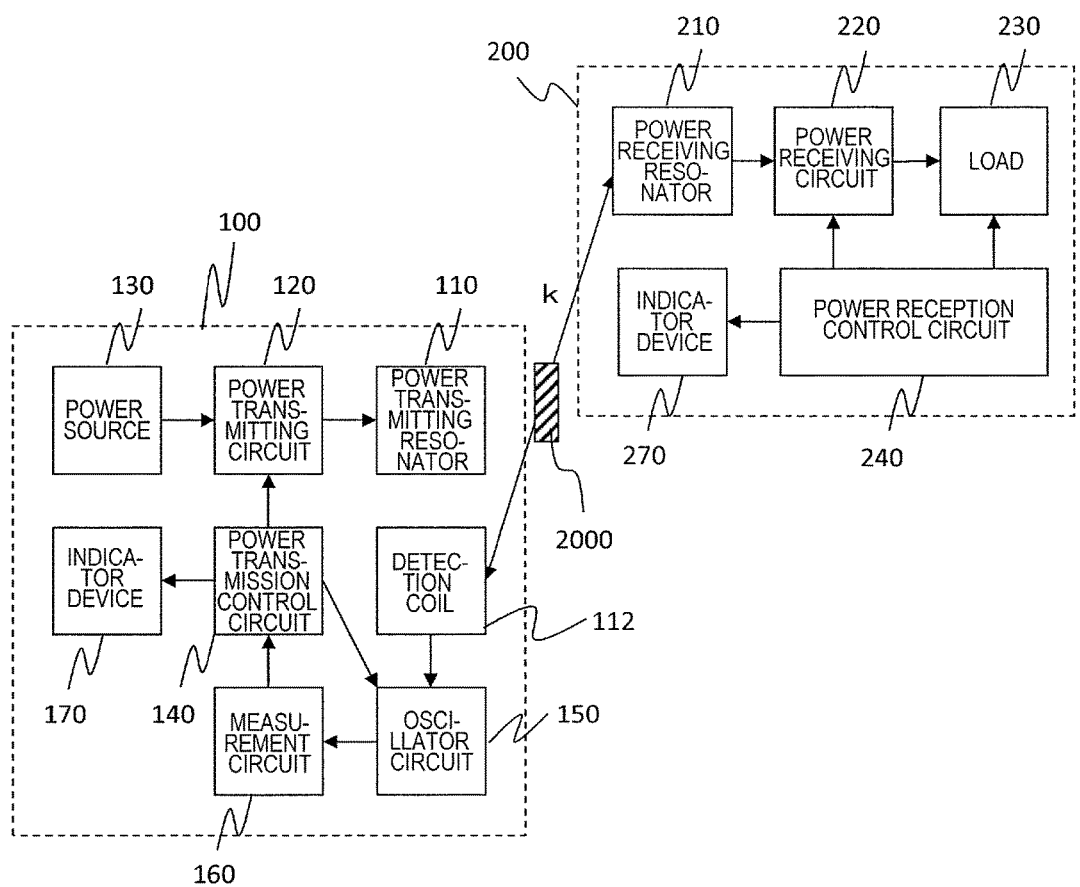
FIG. 9 A block diagram showing a schematic construction of a wireless power transmission system according to Embodiment 2.

FIG. 9 is a block diagram showing a schematic construction of a wireless power transmission system according to a second embodiment of the present disclosure.

Although the fundamental construction in the present embodiment is similar to that in Embodiment 1, there is a difference in that the power transmitting coil included in the power transmitting resonator 110 and the detection coil used for foreign object detection are separate. Allotting a separate detection coil for foreign object detection not only makes it unnecessary to provide a switch between the power transmitting resonator 110 and the oscillator circuit 150, but also allows the detection coil and the power transmitting coil to be disposed at different positions, thereby improving the design freedom for the power transmitting device 100.

Moreover, in an environment where foreign objects may stray in during power transmission (e.g., power feeding to an electric vehicle), changes over time of the coupling coefficient or voltage may be measured in real time, while transmitting power. Based on such measurement results, the transmission frequency may be altered to optimum values in accordance with changes over time of the coupling coefficient, or power transmission may be safely stopped, for example. This provides an outstanding effect of enhancing the safety of the wireless power transmission system while also enhancing the transmission efficiency.

In the present embodiment, not the power transmitting resonator 110 but the detection coil 112 functions as the first resonator according to the present disclosure. Therefore, the measurement circuit 160 detects a metallic foreign object based on changes in input impedance of the detection coil 112 as measured while the oscillator circuit 150 is oscillating at the first frequency f1 and changes in input impedance of the detection coil 112 as measured while the oscillator circuit 150 is oscillating at the second frequency f2. For example, an input inductance value Lin(f1) of the detection coil 112 may be measured while the oscillator circuit 150 is oscillating at the first frequency f1, and an input inductance value Lin(f2) of the detection coil 112 may be measured while the oscillator circuit 160 is oscillating at the second frequency f2. Then, based on these detected values, a metallic foreign object between the detection coil 112 and the power receiving resonator 210 can be detected.

Embodiment 3

Figure 10:
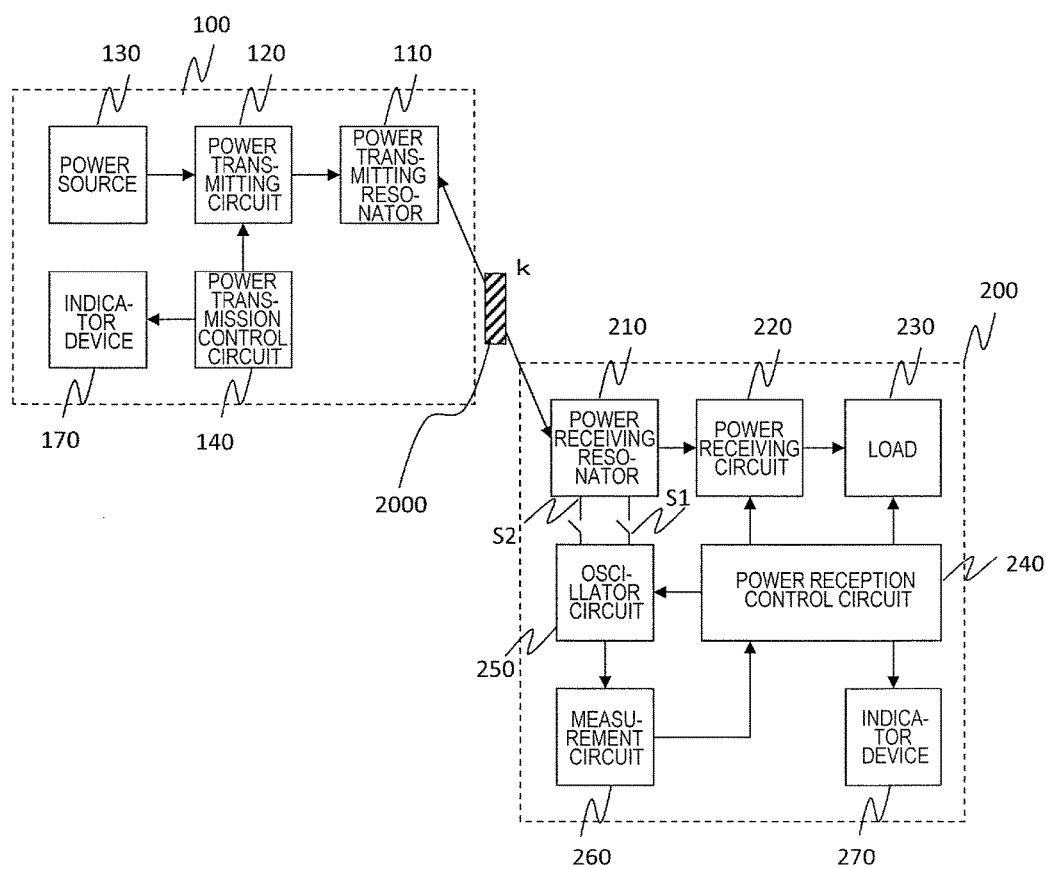
FIG. 10 A block diagram showing a schematic construction of a wireless power transmission system according to Embodiment 3.

FIG. 10 is a block diagram showing a schematic construction of a wireless power transmission system according to a third embodiment of the present disclosure.

The present embodiment is similar to Embodiment 1 in fundamental construction, except for the following differences: the concept of FIG. 1 is changed to the concept of FIG. 3; an oscillator circuit 250 and a measurement circuit 260 for foreign object detection are provided in the power receiving device 200; and the power transmitting resonator 110 includes a parallel capacitor so as to resonate at the resonant frequency fr.

There are cases where the power receiving device 200 is larger than the power transmitting device 100. For example, there may be a case where a large-sized power receiving device 200 such as a tablet terminal is to be charged by a small-sized power transmitting device 100. A problem resides in such a case in that the power receiving device 200 may obscure the indicator device 170 which is included in the power transmitting device 100 for notification of the presence of a foreign object, thus making it difficult to confirm whether a foreign object exists or not.

In the wireless power transmission system of the present embodiment, under the foreign object detection mode, while the oscillator circuit 250 in the power receiving device 200 is oscillating at the frequencies f1 and f2, the measurement circuit 260 in the power receiving device 200 may measure the frequency of the power receiving resonator 210, whereby an input impedance of the power receiving resonator 210 can be measured. In other words, when the power transmitting resonator 110 and the power receiving resonator 210 are coupled via an electromagnetic field and the power transmitting device 100 is operating under the foreign object detection mode, oscillation waveforms at the two frequencies f1 and f2 can also be observed in the power receiving resonator 210 in the power receiving device 200. These may be measured, and eq. 5, or a corrected equation of eq. 5, may be used to calculate and estimate the coupling coefficient k from a ratio between the resultant oscillation frequencies f1 and f2. In order to realize this, a known self-excited type oscillator circuit based on the LC resonance principle is used for the oscillator circuit 250 of the present embodiment. Note that, within a system which embraces circuit reversibility, regardless of whether the coupling coefficient is estimated at the power transmitting resonator side or estimated at the power receiving resonator side, the coupling coefficient which is obtained according to the present embodiment will exhibit the same value. That is, it will be the same value as the coupling coefficient that is estimated according to Embodiment 1 and Embodiment 2.

According to the present embodiment, for example, the indication on the indicator device 270 of the power receiving device 200 may be altered in accordance with changes in the coupling coefficient k between the power transmitting and power receiving coils, thereby notifying the user of the presence or absence of a foreign object. Note that, without being limited to the case where the power receiving device 200 is larger in size than the power transmitting device 100, the construction of the present embodiment may also be adopted in the case where the power receiving device 200 is smaller in size than the power transmitting device 100. In the case where the power receiving device 200 includes the oscillator circuit 250, it is easy to adopt the construction of the present embodiment. In the above example, a foreign object is detected based on a coupling coefficient k which is translated from a ratio between oscillation frequencies; however, the foreign object detection may instead be based on any other parameter that changes in accordance with changes in input impedance of the power receiving resonator 210 functioning as the first resonator.

Embodiment 4

Figure 11:
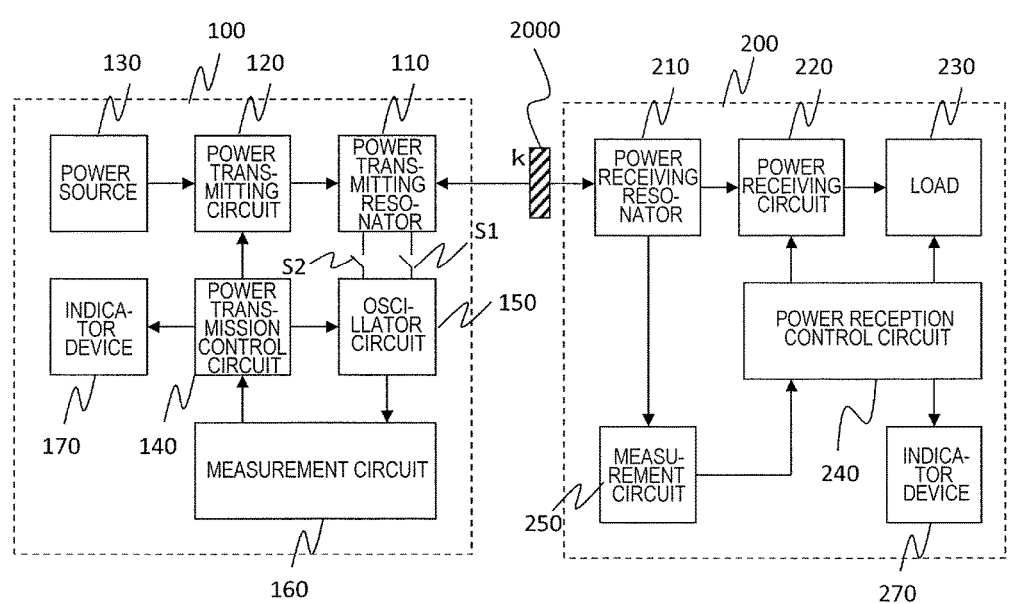
FIG. 11 A block diagram showing a schematic construction of a wireless power transmission system according to Embodiment 4.

FIG. 11 is a block diagram showing a schematic construction of a wireless power transmission system according to a fourth embodiment of the present disclosure. Although it is similar in fundamental construction to Embodiment 3, there is a difference in that the oscillator circuit 150 and the measurement circuit 160 for foreign object detection are provided in the power transmitting device 100, and that the power receiving device 200 lacks the oscillator circuit 250.

Based on a coupling coefficient k which is calculated and estimated at the power receiving device 200 side by using the measurement circuit 250 in a similar manner to Embodiment 3, the indicator device 270 in the power receiving device 200 can achieve a function of notifying the user of the presence of a foreign object. With the construction of the present embodiment, a foreign object between coils can be detected both at the power transmitting device 100 side and at the power receiving device 200 side. There is also an effect in that, since the power receiving device 200 does not need the oscillator circuit 150, the power receiving device 200 can be made thin.

In Embodiments 3 and 4, a power receiving coil and a detection coil may be separately provided, similarly to Embodiment 2.

Embodiment 5

Figure 12:
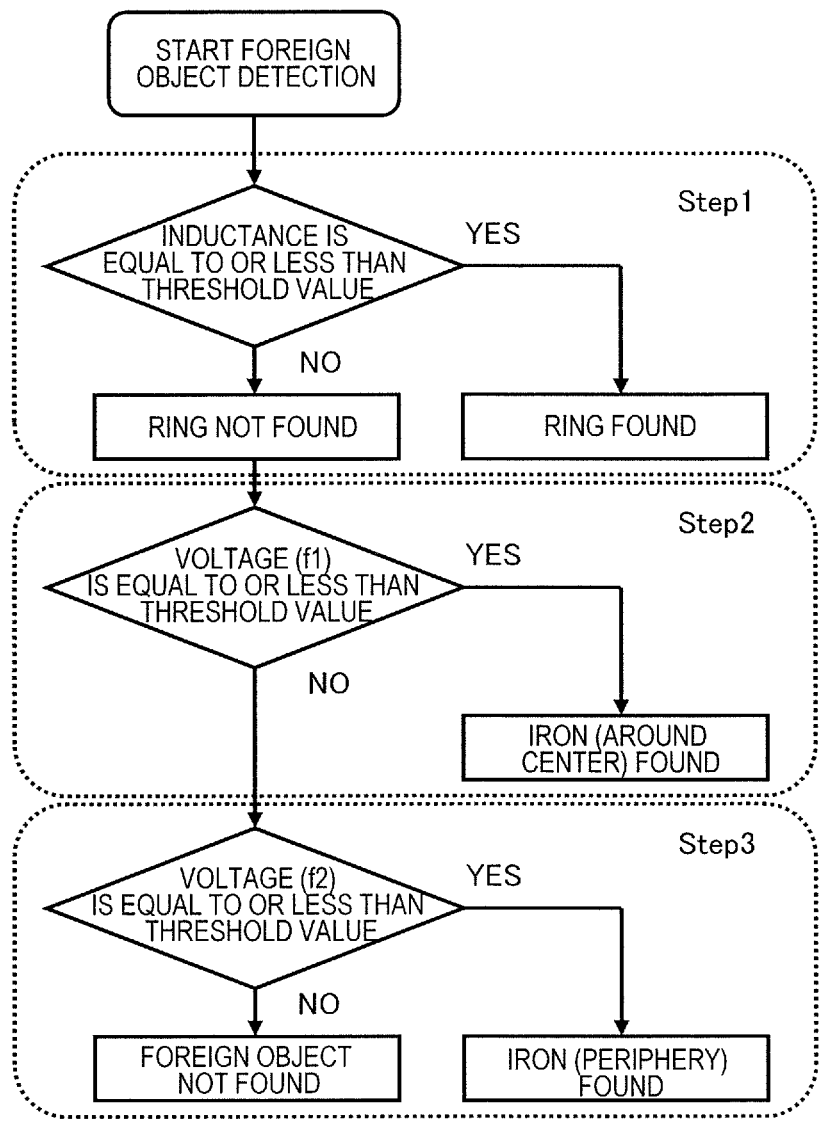
FIG. 12 A flowchart showing an operation of a wireless power transmission system according to Embodiment 5.

FIG. 12 is a flowchart showing an operation of a wireless power transmission system according to a fifth embodiment of the present disclosure. The measurement circuit in the present embodiment detects a metallic foreign object through a process of three steps which are based on different parameters and threshold values. Herein, an input inductance of the first detector, a voltage at the frequency f1, and a voltage at the frequency f2 are selected as the parameters, and it is determined whether or not these are respectively equal to or less than predetermined threshold values. This allows a foreign object to be detected with high accuracy, regardless of the characteristics or position of the foreign object.

Hereinafter, details of the three steps (Steps 1 to 3) according to the present embodiment will be described.

<Step 1>

In the case where a piece of metal that intercepts a magnetic field exists between the power transmitting and power receiving coils, a current which is out-of-phase with that in the coil flows on the metal surface, thereby lowering the input inductance of the coil. Therefore, it may be determined that a foreign object exists if the input inductance of the coil is equal to or less than a predetermined threshold value. However, the coupling coefficient may differ depending on the combination of power transmitting and power receiving coils, and the amount of decrease in inductance may be various. Therefore, it may be ensured that the inductance threshold value Lth is a mathematical function of the coupling coefficient k, whereby a foreign object between the coils can be detected with respect to coil pairs of different combinations. In the example shown in FIG. 12, if the input inductance of the coil is equal to or less than the predetermined threshold value, it is determined that a foreign object that is likely to intercept a magnetic field (e.g., a ring-shaped metallic foreign object) exists. Conversely, if the input inductance of the coil exceeds the predetermined threshold value, it is determined that no such foreign object exists.

<Steps 2 and 3>

In the case where a piece of metal that is unlikely to intercept a magnetic field (e.g., iron) exists between the power transmitting and power receiving coils, the magnetic field will pass through the foreign object, so that the coupling coefficient is unlikely to be lowered and thus is difficult to detect by the above-described method. However, when a magnetic field passes through such a foreign object, an eddy current occurs in the foreign object, thus causing a voltage drop across the coil ends, which lowers the amplitude of the oscillation waveform (voltage). Therefore, it may be determined that a foreign object exists if the amplitude of a voltage across the coil ends is equal to or less than a predetermined threshold value. However, the coupling coefficient differs depending on the combination of power transmitting and power receiving coils, and the amount of decrease in voltage may be various. Therefore, by ensuring that the threshold value Vth for voltage is a mathematical function of the coupling coefficient k or a mathematical function of the inductance Lin (or the oscillation frequency f), a foreign object between the coils can be detected with respect to coil pairs of different combinations.

In Step 2, the measurement circuit determines whether or not the voltage across the coil ends while the oscillator circuit is oscillating at the frequency f1, which is smaller than the resonant frequency fr, is equal to or less than the predetermined threshold value. This makes it possible to detect whether a metallic foreign object that is unlikely to intercept a magnetic field, e.g., iron, exists around the center, between the power transmitting and power receiving coils. On the other hand, in Step 3, the measurement circuit determines whether or not the voltage across the coil ends while the oscillator circuit is oscillating at the frequency f2, which is greater than the resonant frequency fr, is equal to or less than the predetermined threshold value. This makes it possible to detect whether a metallic foreign object that is unlikely to intercept a magnetic field, e.g., iron, exists in a peripheral region away from the center, between the power transmitting and power receiving coils. Hereinafter, this principle will be described.

Figure 13A:
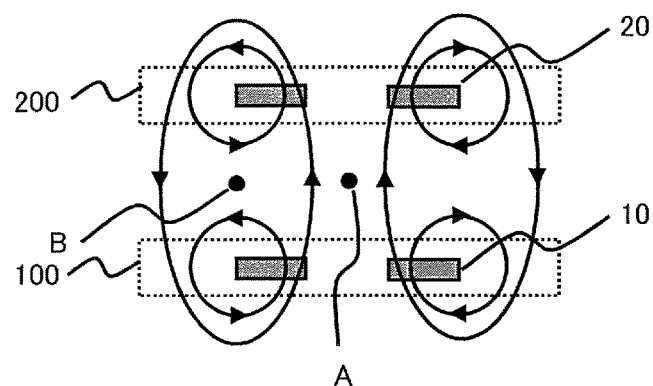
FIG. 13A A schematic illustration showing a flow of magnetic flux under an operation mode in which a first resonator 10 and a second resonator 20 are electromagnetically coupled at a frequency f1.
Figure 13B:
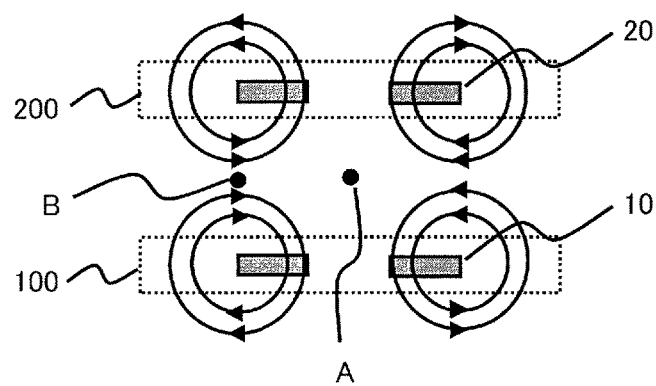
FIG. 13B A schematic illustration showing a flow of magnetic flux under an operation mode in which the first resonator 10 and the second resonator 20 are electromagnetically coupled at a frequency f2.

FIG. 13A is a schematic illustration showing a flow of magnetic flux under an operation mode in which the first resonator 10 and the second resonator 20 are electromagnetically coupled at the frequency f1. This operation mode, predominant in a frequency band which is smaller than the resonant frequency fr, is called the odd mode. FIG. 13B is a schematic illustration showing a flow of magnetic flux under an operation mode in which the first resonator 10 and the second resonator 20 are electromagnetically coupled at the frequency f2. This operation mode, predominant in a frequency band which is greater than the resonant frequency fr, is called the even mode.

As shown in FIG. 13A, in the odd mode, the magnetic flux is dense around the central portion A between the two coils, whereas the magnetic flux is sparse in an intermediate portion between the wiring portions extending from the inner diameter to the outer diameter of each coil (peripheral portion B). Therefore, in an odd mode operation, there is more magnetic flux penetrating the foreign object when the foreign object is around the central portion A, thus facilitating detection. Conversely, there is less magnetic flux penetrating through the foreign object when the foreign object is around the peripheral portion B, thus making detection difficult. Therefore, in Step 2, it can be determined that a metallic foreign object such as iron exists around the central portion A when the voltage across the coil ends at the frequency f1 is equal to or less than the threshold value.

On the other hand, as shown in FIG. 13B, in the even mode, the magnetic flux is sparse around the central portion A between the two coils, whereas the magnetic flux is dense in an intermediate portion between the wiring portions extending from the inner diameter to the outer diameter of each coil (peripheral portion B). Therefore, in an even mode operation, there is less magnetic flux penetrating the foreign object when the foreign object is around the central portion A, thus making detection difficult. There is more magnetic flux penetrating the foreign object when the foreign object is around the peripheral portion B, thus facilitating detection. Therefore, in Step 3, it can be determined that a metallic foreign object such as iron exists around the peripheral portion B when the voltage across the coil ends at the frequency f2 is equal to or less than the threshold value.

Thus, the present embodiment performs a three-stepped determination process which enables detection of a variety of metallic foreign objects. Although foreign objects are detected based on inductance and voltage in the above example, the parameters to be used for foreign object detection are not limited thereto. For example, a parameter(s) that is arbitrarily selected from among an oscillation frequency f, a coupling coefficient k, a voltage V, and an inductance Lin as measured by the measurement circuit may be used. Moreover, the threshold value for each parameter may be prescribed to be a mathematical function of at least one of the above parameters. By thus setting the parameters and threshold values as appropriate, it becomes possible to detect a foreign object between the power transmitting and power receiving coils even with respect to different combinations of power transmitting coils and power receiving coils, i.e., coil pairs with different coupling coefficients. Although the present embodiment performs a three-stepped determination process, the measurement circuit may be configured to perform a determination process in two steps, or four or more steps.

Other Embodiments

<Pre-Detection Process>

According to Embodiments 1 to 5 above, the foreign object detector is able to operate at several μA to several mA, for example, and thus foreign object detection can be achieved with power-frugal circuitry. On the other hand, during wireless power transmission, an electric power of e.g. several W to several kW is transmitted from the power transmitting resonator 110 to the power receiving resonator 210. During this wireless power transmission, if the power transmission mode transitions to the foreign object detection mode, stored energy in the coil will flow into the foreign object detection circuit, thus resulting in a possible burnout as the breakdown voltage of foreign object detection circuit is exceeded.

In the present embodiment, energy that was stored in the coil during wireless power transmission is released to ground before the foreign object detection mode is entered. Doing this prevents a burnout of the circuitry used for foreign object detection. Specifically, when switching from the power transmission mode to the foreign object detection mode, among the inverters which are included in the power transmitting circuit 120, the switch of an MOSFET that is directly connected to ground is turned ON first. This releases the energy that was stored in the coil L1 in the power transmitting resonator 110 to ground. Thereafter, after the lapse of a predetermined time, the foreign object detection mode may be started. Such an operation is possible in any one of the above-described embodiments.

<Post-Detection Process>

According to Embodiments 1 to 5 above, the foreign object detector is able to surely detect a foreign object that exists between coils. However, when it is determined that a foreign object exists, immediately stopping power transmission or preventing it from being started results in an inability to charge, thus potentially detracting from the user's convenience. Accordingly, even if an evaluation value serving as a reference of determination happens to be equal to or less than a predetermined threshold value, power transmission may be allowed while applying power transmission control so that the temperature of the foreign object is equal to or less than a predetermined threshold value, thereby enabling power transmission with ensured safety. Specifically, in accordance with a parameter which is determined based on data that is experimentally or analytically obtained in advance, intermittent power transmissions may be made at predetermined time intervals; power transmission may be performed with a reduced transmitted power according to a predetermined reduction ratio; temperature sensors may be disposed in the neighborhood of the power transmitting and power receiving coils in order to adjust the transmitted power while monitoring temperature, and so on.

<Method of Setting Threshold Values>

In the case of determining the presence or absence of a foreign object based on plural parameters as in Embodiment 5, various methods of determination may be possible, as illustrated in FIG. 14A to FIG. 14D. The parameters include, as described above: inductance; resistance; the Q factor of the coil; a frequency, a voltage value, or the like that is obtained through conversion therefrom; and so on. An example of threshold value setting in the case where two parameters P1 and P2 are selected from among them is described below.

Figure 14A:
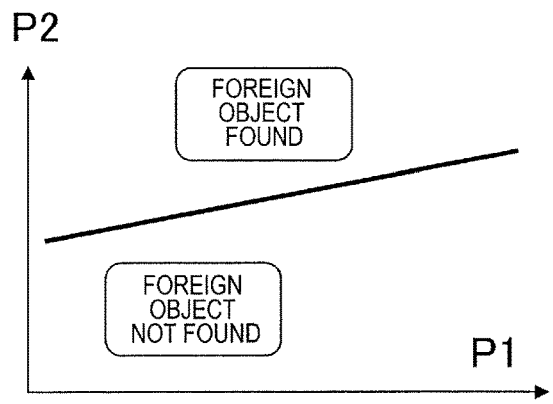
FIG. 14A A diagram showing a first example of a method of determining the presence or absence of a foreign object based on plural parameters.
Figure 14B:
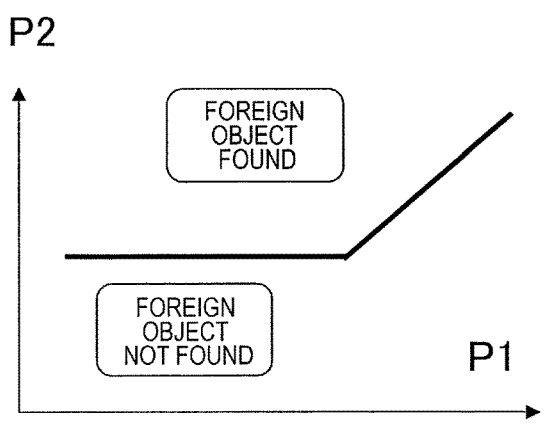
FIG. 14B A diagram showing a second example of a method of determining the presence or absence of a foreign object based on plural parameters.
Figure 14C:
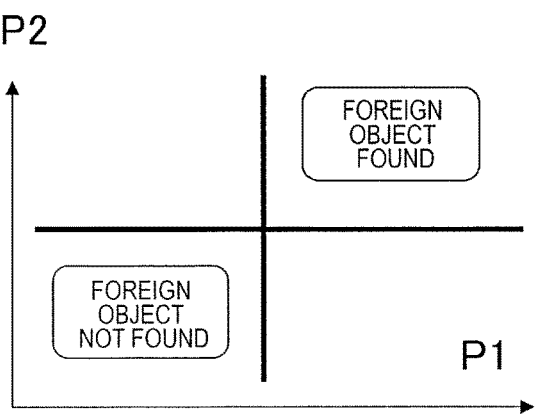
FIG. 14C A diagram showing a third example of a method of determining the presence or absence of a foreign object based on plural parameters.
Figure 14D:
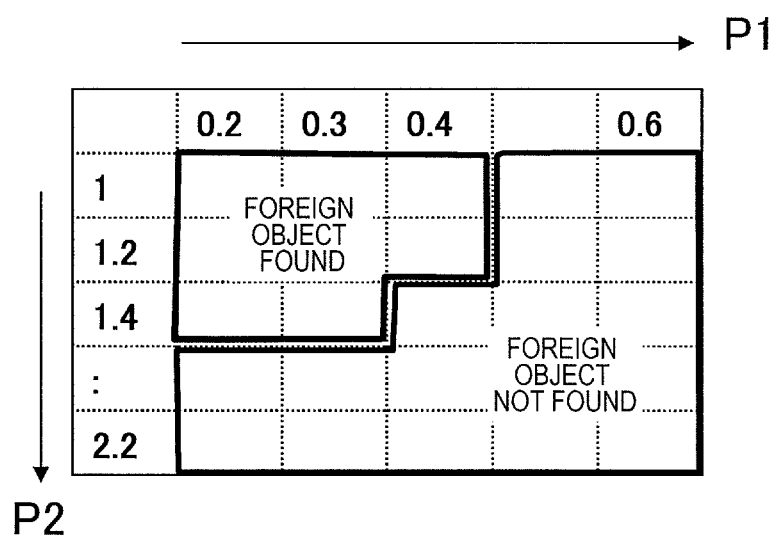
FIG. 14D A diagram showing a fourth example of a method of determining the presence or absence of a foreign object based on plural parameters.

FIG. 14A is a diagram showing an example in the case where a threshold value for the parameter P2 is a linear function of the parameter P1. This provides an effect in that the determination process is simplified, thus reducing the computation load. Alternatively, as shown in FIG. 14B, the threshold value for the parameter P2 may be a constant value until P1 reaches a certain value, and after P1 has exceeded that value, the threshold value for P2 may become a linear function of P1. Alternatively, the threshold value for P2 may be different linear functions in different ranges of P1. By thus setting linear threshold values in multiple steps, an enhanced accuracy of foreign object detection can be obtained while reducing the computation load. Moreover, as shown in FIG. 14C, threshold values may be independently set for the parameters P1 and P2, thus further simplifying the determination. Alternatively, a method as shown in FIG. 14D may be possible, where combinations of values of the parameters P1 and P2, for the case where a foreign object exists and for the case where no foreign object exists, are stored in advance as table values in a memory of the control circuit. Although this method uses more memory, it provides an advantage in that the presence or absence of a foreign object can be surely determined.

<Updating Threshold Values>

The information concerning the threshold value setting according to Embodiment 5 is to be stored in a memory of the control circuit at shipment of the product. However, since there are metallic foreign objects with various physical properties/shapes, there is no guarantee that every dangerous state can be detected based on threshold values which were determined only once. Therefore, by keeping a record of the actual state of use by the user and dynamically updating the threshold values, the safety after product shipment can be enhanced.

Figure 15:
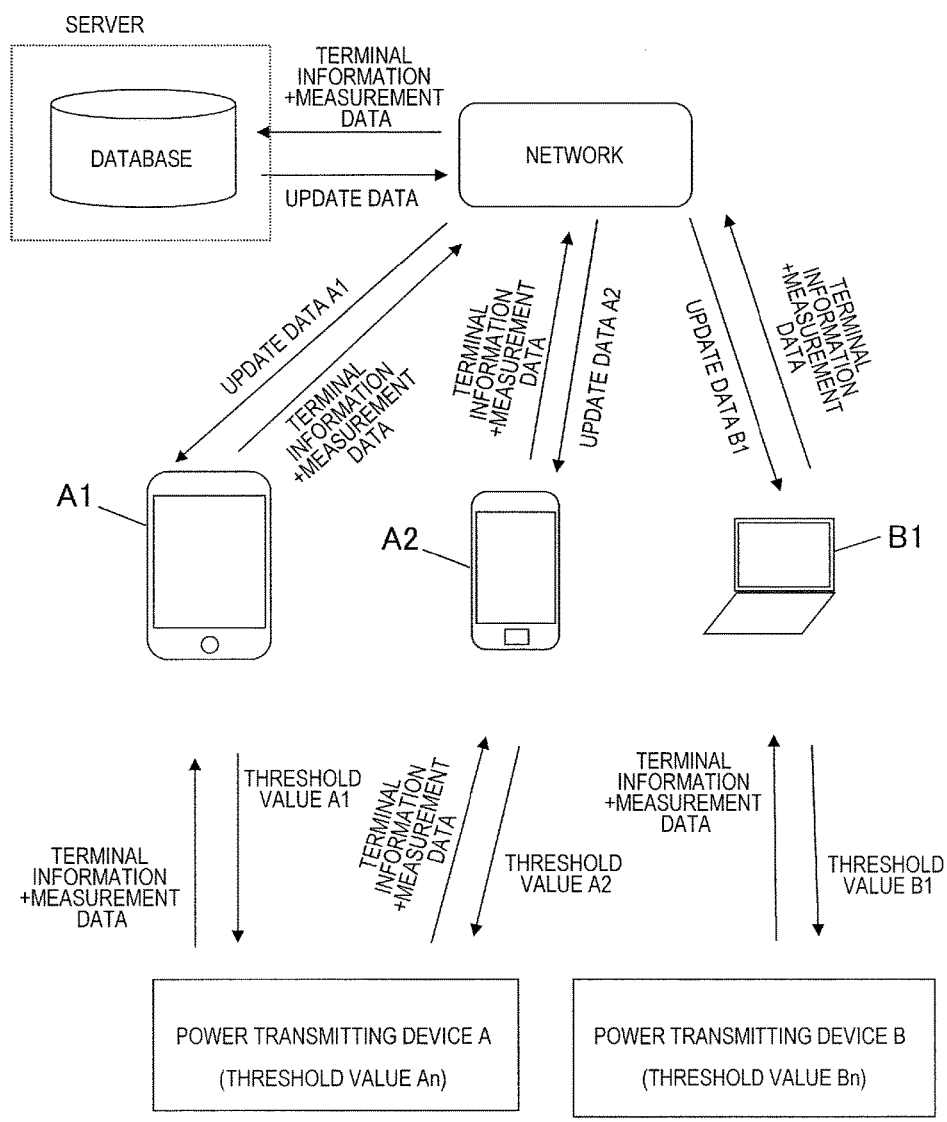
FIG. 15 A conceptual diagram showing an example of a method of updating threshold values.

FIG. 15 is a conceptual diagram showing an example of a method of updating threshold values, where power transmitting devices A and B are not connected to a network, but power receiving devices A1, A2 and B1 are connected to the network. Information for setting threshold values is managed in a database, on a server which is connected to the network. Via the network, the server collects terminal information and measurement data form each power receiving device. Then, it analyzes the collected information, and sends update data concerning the threshold value setting to each terminal. Based on the update data received from the server, each terminal updates the threshold value setting for each parameter.

The terminal information may include an ID which is specific to the terminal or model name information, such that the information allows the type of the power receiving coil to be identified, for example. In addition to information of the aforementioned parameters as measured by the measurement circuit included in the power transmitting device or the power receiving device, the measurement data may also include information concerning wireless charging (charging profile, transmission frequency, transmitted power, temperature, etc.) and location information concerning the conditions under which the user mounted the terminal (e.g., coordinate/angular velocity data as obtained by an acceleration sensor or a motion sensor upon terminal mountment).

These terminal information and measurement data are sent to the server via the network. In the server, the measurement data are managed in a database with respect to each terminal model, thus allowing a comparison of charging results among different combinations of parameters and location information. This allows differences in the parameters, location information, charging profiles to be compared among different users of the same model.

For example, suppose that, for the same model and for the same transmission frequency, one user needed to spend about twice the usual charging time. This means that a part of the transmitted energy was lost somewhere. For example, it may indicate the existence of a foreign object between the power transmitting and power receiving coils, emitting heat. If a clear difference from usual is observed in the temperature data, it can be determined that a foreign object was present. Then, the mounting conditions for the terminal which required about twice the usual charging time and the parameter(s) obtained by the measurement circuit are subjected to comparison, thus to extract a characteristic difference in the coil voltage.

Thus, by linking plural pieces of measurement data with the power receiving coil information, it becomes possible to know what sort of mounting conditions and terminal a given parameter obtained by the measurement circuit emanated from. This makes it possible to know, at the server side, what sort of charging characteristics have been obtained on those mounting conditions and terminal.

Based on the above analysis results, the server sends information of a new threshold value to the power transmitting device via the power receiving device, so that any dangerous state as mentioned above will not occur. Through such a procedure, even after product shipment, the accuracy of foreign object detection and user safety can be enhanced.

In a similar concept, in the case where the power transmitting device is connected to the network, the aforementioned measurement data and terminal information may be directly sent from the power transmitting device to the server. In that case, when updating the threshold values, data concerning the threshold value setting may be sent from the server to the power transmitting device.

Example

Hereinafter, an Example of the present disclosure will be described. In this Example, in the construction of Embodiment 5, the effect of foreign object detection was studied by using a plurality of terminals for evaluation.

Figure 16:
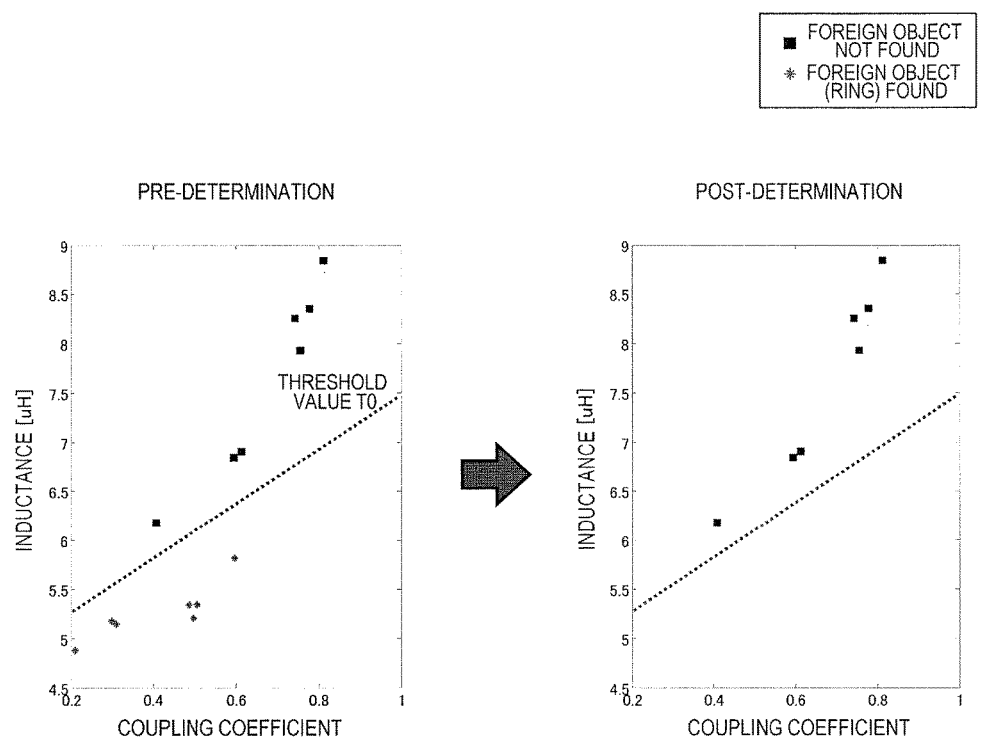
FIG. 16 A first diagram showing study results according to Example.
Figure 17:
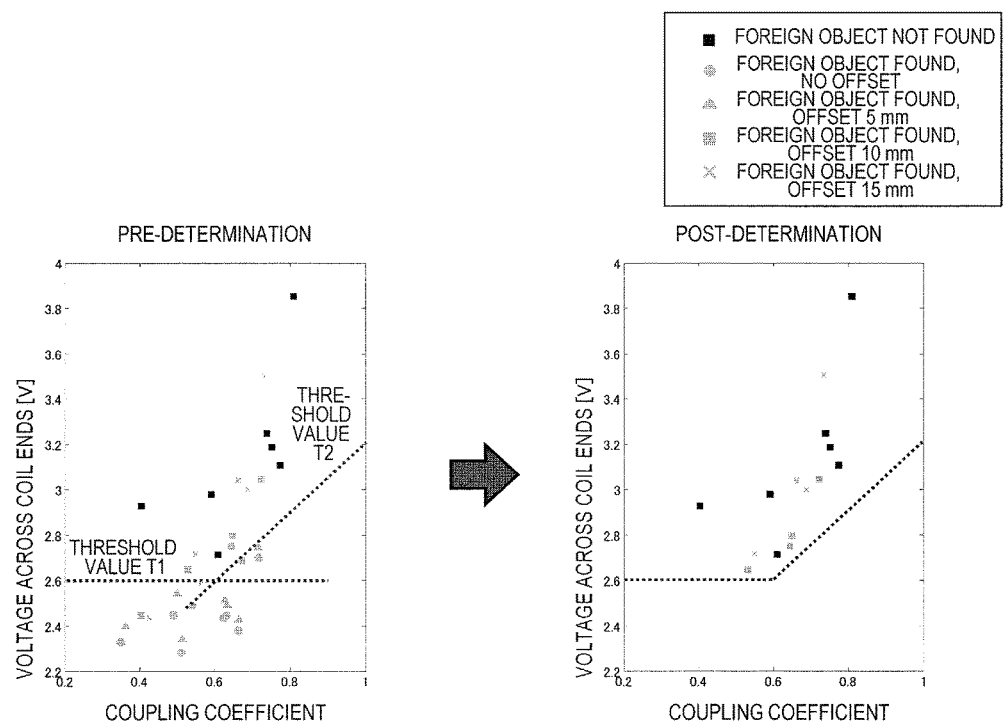
FIG. 17 A second diagram showing study results according to Example.
Figure 18:
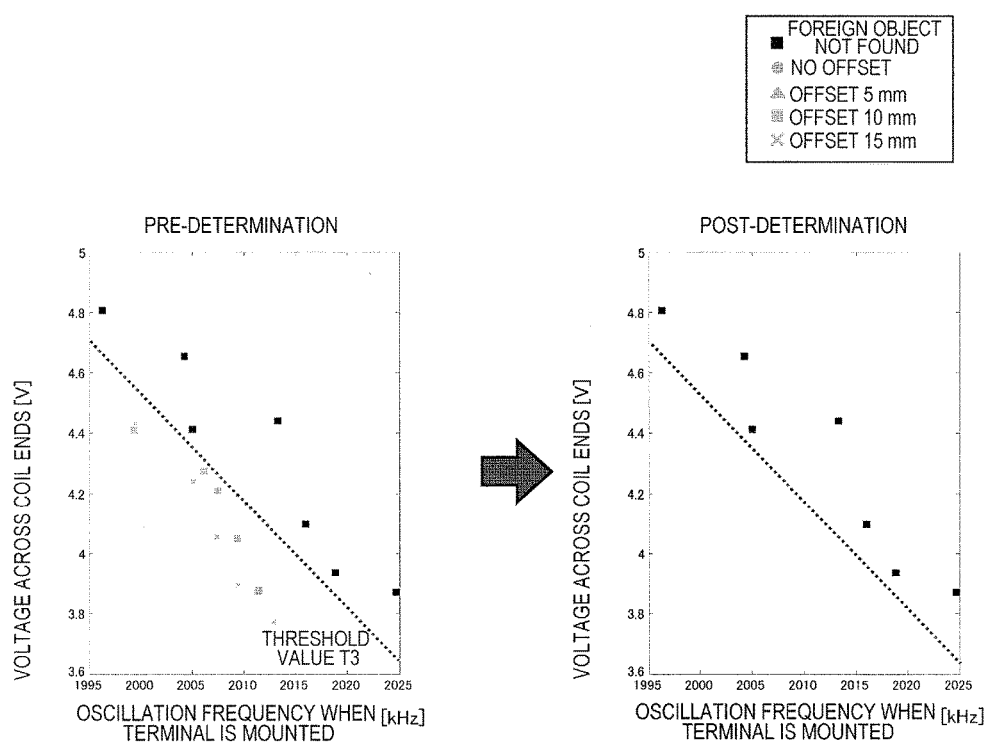
FIG. 18 A third diagram showing study results according to Example.

FIGS. 16 to 18 are diagrams showing detection results of determining the presence or absence of a foreign object by using 7 models of terminals for evaluation having a power transmitting coil ($\phi$43 mm) and power receiving coils ($\phi$22 mm to 40 mm) of different dimensions, based on the flowchart shown in FIG. 12. The 7 models of terminals for evaluation had a power receiving coil which was connected to a parallel capacitor, and their resonant frequency fr, as determined by the power receiving coil and the parallel capacitor, was set to 1000 kHz. The oscillator circuit of the foreign object detector was a self-excited type Pierce oscillator circuit capable of oscillating at a first frequency f1 which is lower than the resonant frequency fr and a second frequency f2 which is higher than the resonant frequency fr. In selecting the foreign objects for evaluation in this Example, a metal ring ($\phi$22 mm) was chosen as a foreign object intercepting a magnetic field and an iron disk ($\phi$15 mm) was chosen as a foreign object unlikely to intercept a magnetic field.

First, according to Step 1 in FIG. 12, the presence or absence of a metal ring was determined. The results of measurement in the left graph of FIG. 16 indicate a tendency that the inductance lowers as the coupling coefficient decreases. They also indicate a tendency that the inductance further lowers if a metal ring exists between the power transmitting and power receiving coils. Therefore, a threshold value T0 for inductance was set by taking this difference into account. The threshold value T0 was a mathematical function of the coupling coefficient as a variable, defining that a foreign object existed when equal to or less than T0. In the right graph of FIG. 16, those which had an inductance equal to or less than threshold value T0 were eliminated. A comparison between the pre-determination (left graph) and the post-determination (right graph) in FIG. 16 indicates that any metal ring existing between the power transmitting and power receiving coils was determined as dangerous, thus being surely eliminated.

Next, according to Step 2 in FIG. 12, the presence or absence of an iron disk (around the center) is determined. Offset positions of an iron disk from the center of the power transmitting coil were set to the four values of 0 mm, 5 mm, 10 mm and 15 mm; the frequency was set to f1 (odd mode); and evaluation was performed. The results of measurement in the left graph of FIG. 17 indicate a tendency that the voltage lowers as the coupling coefficient decreases. They also indicate a tendency that the voltage across the coil ends further lowers if an iron disk exists between the power transmitting and power receiving coils. Therefore, threshold values T1 and T2 for the voltage across the coil ends were set based on this difference. The threshold values T1 and T2 were mathematical functions of the coupling coefficient as a variable, defining that a foreign object existed if the voltage across the coil ends was equal to or less than T1 or equal to or less than T2. A comparison between the pre-determination (left graph) and the post-determination (right graph) in FIG. 17 indicates that any iron disk with an offset of 0 mm to 5 mm existing between the power transmitting and power receiving coils was determined as dangerous, thus being surely eliminated. Since this operation mode is the aforementioned odd mode operation, the magnetic flux around the centers the coils is dense. Thus, iron disks with an offset of 0 to 5 mm were mainly detected.

Finally, according to Step 3 in FIG. 12, the presence or absence of an iron disk (peripheral portion) is determined. Offset positions of an iron disk from the center of the power transmitting coil were set to the four values of 0 mm, 5 mm, 10 mm and 15 mm; the frequency was set to f2 (even mode); and evaluation was performed. However, those foreign objects which were eliminated through Step 2 are not shown in FIG. 18. The results of measurement in the left graph of FIG. 18 indicate a tendency that the voltage across the coil ends lowers as the oscillation frequency increases, i.e., as the inductance, which is an inverse thereof, decreases. They also indicate a tendency that the voltage further lowers if an iron disk exists between the power transmitting and power receiving coils. Therefore, a threshold value T3 for the voltage across the coil ends was set based on this difference. The threshold value T3 was a mathematical function of the oscillation frequency as a variable, defining that a foreign object existed if the voltage across the coil ends was equal to or less than T3. A comparison between the pre-determination (left graph) and the post-determination (right graph) in FIG. 18 indicates that any iron disk with an offset of 10 mm to 15 mm existing between the power transmitting and power receiving coils was determined as dangerous, thus being surely eliminated. Since this operation mode is the aforementioned even mode operation, the magnetic flux in a region from the inner diameter to the outer diameter of each coil is dense. Therefore, iron disks with an offset of 10 to 15 mm were mainly detected.

Thus it was confirmed that, through the procedure from Step 1 to Step 3, a foreign object between coils can be surely detected even with respect to different combinations of power transmitting and power receiving coils. The measurement parameters (voltage, frequency, coupling coefficient) used for the foreign object determination in this Example are exemplary, and similar detection is also possible by using other parameters. It is possible to detect the presence or absence of a foreign object based on the input impedances of the detecting resonator at a frequency f1 which is lower than the aforementioned resonant frequency fr and a frequency f2 which is higher than the resonant frequency fr, or a secondary parameter which is calculated therefrom, or a tertiary parameter which is calculated from a combination thereof. The selections of these parameters and threshold values may be appropriately adapted to the particular applications of the power transmitting device and power receiving device including the foreign object detector according to the present disclosure.

INDUSTRIAL APPLICABILITY

A foreign object detector and a wireless power transmission system according to the present disclosure is broadly applicable to the charging or power feeding for electric vehicles, AV devices, batteries, medical devices, and the like, for example. According to embodiments of the present disclosure, risks of abnormal heating of a piece of metal existing between coils can be avoided.

REFERENCE SIGNS LIST 100 power transmitting device
110 power transmitting resonator (first resonator)
120 power transmitting circuit
130 power source
140 power transmission control circuit
150 oscillator circuit
160 measurement circuit
170 indicator device
200 power receiving device
210 power receiving resonator (second resonator)
220 power receiving circuit
230 load
240 power reception control circuit
250 oscillator circuit
260 measurement circuit
270 indicator device
S1 to S3 switch

The invention claimed is:

1. A foreign object detector comprising:
a first resonator;
an oscillator circuit that is connected to the first resonator and oscillates at a first frequency (f1) which is lower than a resonant frequency (fr) of a second resonator and at a second frequency (f2) which is higher than the resonant frequency (fr), the second resonator being electromagnetically coupled to the first resonator and being a parallel resonant circuit including a coil and a capacitor; and
a measurement circuit that measures an inductance value of the first resonator while the first and second resonators are electromagnetically coupled to each other, wherein:
the measurement circuit measures an input inductance value Lin(f1) of the first resonator while the oscillator circuit is oscillating at the first frequency f1 and an input inductance value Lin(f2) of the first resonator while the oscillator circuit is oscillating at the second frequency f2, calculates a coupling coefficient k which is calculated by the equation $k^2=1-Lin(f2)/Lin(f1)$, and detects a metallic foreign object between the first resonator and the second resonator based on the coupling coefficient k;
while the coil is short-circuited, the input inductance value Lin(f1) of the first resonator and the input inductance value Lin(f2) of the first resonator are identical; and
while the coil is open, the input inductance value Lin(f1) of the first resonator and the input inductance value Lin(f2) of the first resonator are identical.

2. The foreign object detector of claim 1, wherein,
the oscillator circuit is a self-excited type oscillator circuit, and the input inductance value is in inverse proportion to the square of the oscillation frequency; and
the measurement circuit measures the first frequency f1 and the second frequency f2 and detects a metallic foreign object between the first resonator and the second resonator based on a coupling coefficient k which is calculated by the equation $k^2=1-f1^2/f2^2$.

3. A power transmitting device comprising:
the foreign object detector of claim 1, the first resonator including a power transmitting coil for use both in detecting a metallic foreign object and in wireless power transmission;
a power transmitting circuit that outputs electric power for the wireless power transmission to the power transmitting coil; and
a switch for allowing or disallowing electrical conduction between the oscillator circuit and the power transmitting coil; and
a control circuit that controls the oscillator circuit, the power transmitting circuit and the switch, wherein
the control circuit switches between
a power transmission mode in which the control circuit disallows electrical conduction between the oscillator circuit and the power transmitting coil by using the switch, and drives the power transmitting circuit to supply power to the second resonator, and
a foreign object detection mode in which the control circuit allows the electrical conduction between the oscillator circuit and the power transmitting coil by using the switch and stops driving the power transmitting circuit, to detect a metallic foreign object between the power transmitting coil and the coil in the second resonator.

4. The power transmitting device of claim 3, wherein power provided to the power transmitting coil during the foreign object detection mode is smaller than power provided to the power transmitting coil during the power transmission mode.

5. The power transmitting device of claim 3, wherein the control circuit switches from the foreign object detection mode to the power transmission mode when the control circuit detects in the foreign object detection mode that no foreign object exists and that a fluctuation in the input impedance of the first resonator over time has ceased.

6. The power transmitting device of claim 3, wherein the control circuit determines a beginning frequency and a voltage of the wireless power transmission based on an input impedance value of the first resonator as measured by the measurement circuit.

7. A wireless power transmission system comprising:
the power transmitting device of claim 3;
a power receiving device comprising the second resonator and a power receiving circuit that causes power that the second resonator has received from the first resonator to be supplied to a load.

8. A power transmitting device comprising:
the foreign object detector of claim 1, the first resonator including a detection coil for use in detecting a metallic foreign object;
a power transmitting circuit that outputs electric power for wireless power transmission to a power transmitting coil that is located at a different position from the position of the detection coil; and
a control circuit that controls the oscillator circuit and the power transmitting circuit in the foreign object detector, wherein
the control circuit switches between
a power transmission mode in which the control circuit drives the power transmitting circuit to supply the power to the second resonator, and
a foreign object detection mode in which the control circuit stops driving the power transmitting circuit to detect a metallic foreign object between the power transmitting coil and the coil in the second resonator.

9. A wireless power transmission system comprising:
the power transmitting device of claim 8;
a power receiving device comprising the second resonator and a power receiving circuit that causes power that the second resonator has received from the first resonator to be supplied to a load.

10. A foreign object detector comprising:
a first resonator;
an oscillator circuit that is connected to the first resonator and oscillates at a first frequency (f1) which is lower than a resonant frequency (fr) of a second resonator and at a second frequency (f2) which is higher than the resonant frequency (fr), the second resonator being electromagnetically coupled to the first resonator and being a parallel resonant circuit including a coil and a capacitor; and
a measurement circuit that measures an inductance value of the first resonator while the first and second resonators are electromagnetically coupled to each other, wherein:
the measurement circuit detects a metallic foreign object between the first resonator and the second resonator based on a ratio between an input inductance value Lin(f1) of the first resonator while the oscillator circuit is oscillating at the first frequency f1 and an input inductance value Lin(f2) of the first resonator while the oscillator circuit is oscillating at the second frequency f2;
while the coil is short-circuited, the input inductance value Lin(f1) of the first resonator and the input inductance value Lin(f2) of the first resonator are identical; and
while the coil is open, the input inductance value Lin(f1) of the first resonator and the input inductance value Lin(f2) of the first resonator are identical.

11. A power transmitting device comprising:
the foreign object detector of claim 10, the first resonator including a power transmitting coil for use both in detecting a metallic foreign object and in wireless power transmission;
a power transmitting circuit that outputs electric power for the wireless power transmission to the power transmitting coil; and
a switch for allowing or disallowing electrical conduction between the oscillator circuit and the power transmitting coil; and
a control circuit that controls the oscillator circuit, the power transmitting circuit and the switch, wherein
the control circuit switches between
a power transmission mode in which the control circuit disallows electrical conduction between the oscillator circuit and the power transmitting coil by using the switch, and drives the power transmitting circuit to supply power to the second resonator, and
a foreign object detection mode in which the control circuit allows the electrical conduction between the oscillator circuit and the power transmitting coil by using the switch and stops driving the power transmitting circuit, to detect a metallic foreign object between the power transmitting coil and the coil in the second resonator.

12. The power transmitting device of claim 11, wherein power provided to the power transmitting coil during the foreign object detection mode is smaller than power provided to the power transmitting coil during the power transmission mode.

13. The power transmitting device of claim 11, wherein the control circuit switches from the foreign object detection mode to the power transmission mode when the control circuit detects in the foreign object detection mode that no foreign object exists and that a fluctuation in the input impedance of the first resonator over time has ceased.

14. The power transmitting device of claim 11, wherein the control circuit determines a beginning frequency and a voltage of the wireless power transmission based on an input impedance value of the first resonator as measured by the measurement circuit.

15. A wireless power transmission system comprising:
the power transmitting device of claim 11;
a power receiving device comprising the second resonator and a power receiving circuit that causes power that the second resonator has received from the first resonator to be supplied to a load.

16. A power transmitting device comprising:
the foreign object detector of claim 10, the first resonator including a detection coil for use in detecting a foreign object;
a power transmitting circuit that outputs electric power for wireless power transmission to a power transmitting coil that is located at a different position from the position of the detection coil; and
a control circuit that controls the oscillator circuit and the power transmitting circuit in the foreign object detector, wherein
the control circuit switches between
a power transmission mode in which the control circuit drives the power transmitting circuit to supply the power to the second resonator, and
a foreign object detection mode in which the control circuit stops driving the power transmitting circuit to detect a metallic foreign object between the power transmitting coil and the coil in the second resonator.

17. A wireless power transmission system comprising:
the power transmitting device of claim 16;
a power receiving device comprising the second resonator and a power receiving circuit that causes power that the second resonator has received from the first resonator to be supplied to a load.

18. A foreign object detector comprising:
a first resonator;
an oscillator circuit that is connected to the first resonator and oscillates at a first frequency (f1) which is lower than a resonant frequency (fr) of a second resonator and at a second frequency (f2) which is higher than the resonant frequency (fr), the second resonator being electromagnetically coupled to the first resonator and being a parallel resonant circuit including a coil and a capacitor; and
a measurement circuit that measures an inductance value of the first resonator while the first and second resonators are electromagnetically coupled to each other, wherein:
the measurement circuit measures an input inductance value Lin(f1) of the first resonator while the oscillator circuit is oscillating at the first frequency f1 and an input inductance value Lin(f2) of the first resonator while the oscillator circuit is oscillating at the second frequency f2, and detects a metallic foreign object between the first resonator and the second resonator based on a coupling coefficient k which is calculated by $k^2=1-Lin(f2)/Lin(f1)$;
while the coil is short-circuited, the input inductance value Lin(f1) of the first resonator and the input inductance value Lin(f2) of the first resonator are identical; and
while the coil is open, the input inductance value Lin(f1) of the first resonator and the input inductance value Lin(f2) of the first resonator are identical.

19. The foreign object detector of claim 18, wherein,
the oscillator circuit is a self-excited type oscillator circuit, and the input inductance value is in inverse proportion to the square of the oscillation frequency; and
the measurement circuit measures the first frequency f1 and the second frequency f2 and detects a metallic foreign object between the first resonator and the second resonator based on a coupling coefficient k which is calculated by the equation $k^2=1-f1^2/f2^2$.

20. A power transmitting device comprising:
the foreign object detector of claim 18, the first resonator including a power transmitting coil for use both in detecting a metallic foreign object and in wireless power transmission;
a power transmitting circuit that outputs electric power for the wireless power transmission to the power transmitting coil; and
a switch for allowing or disallowing electrical conduction between the oscillator circuit and the power transmitting coil; and a control circuit that controls the oscillator circuit, the power transmitting circuit and the switch, wherein
the control circuit switches between
a power transmission mode in which the control circuit disallows electrical conduction between the oscillator circuit and the power transmitting coil by using the switch, and drives the power transmitting circuit to supply power to the second resonator, and
a foreign object detection mode in which the control circuit allows the electrical conduction between the oscillator circuit and the power transmitting coil by using the switch and stops driving the power transmitting circuit, to detect a metallic foreign object between the power transmitting coil and the coil in the second resonator.

21. A power transmitting device comprising:
the foreign object detector of claim 18, the first resonator including a detection coil for use in detecting a metallic foreign object;
a power transmitting circuit that outputs electric power for wireless power transmission to a power transmitting coil that is located at a different position from the position of the detection coil; and
a control circuit that controls the oscillator circuit and the power transmitting circuit in the foreign object detector, wherein
the control circuit switches between
a power transmission mode in which the control circuit drives the power transmitting circuit to supply the power to the second resonator, and
a foreign object detection mode in which the control circuit stops driving the power transmitting circuit to detect a metallic foreign object between the power transmitting coil and the coil in the second resonator.

22. The power transmitting device of claim 21, wherein power provided to the power transmitting coil during the foreign object detection mode is smaller than power provided to the power transmitting coil during the power transmission mode.

23. The power transmitting device of claim 21, wherein the control circuit switches from the foreign object detection mode to the power transmission mode when the control circuit detects in the foreign object detection mode that no foreign object exists and that a fluctuation in the input impedance of the first resonator over time has ceased.

24. The power transmitting device of claim 21, wherein the control circuit determines a beginning frequency and a voltage of the wireless power transmission based on an input impedance value of the first resonator as measured by the measurement circuit.

25. A wireless power transmission system comprising:
the power transmitting device of claim 21;
a power receiving device comprising the second resonator and a power receiving circuit that causes power that the second resonator has received from the first resonator to be supplied to a load.

* * * * *

UNITED STATES PATENT AND TRADEMARK OFFICE
CERTIFICATE OF CORRECTION

PATENT NO.         : 10,170,939 B2
APPLICATION NO.    : 15/118165
DATED              : January 1, 2019
INVENTOR(S)        : Kenichi Asanuma et al.

Page 1 of 1

It is certified that error appears in the above-identified patent and that said Letters Patent is hereby corrected as shown below:

On the Title Page

Item (73), The NAME OF ASSIGNEE is corrected to:
Panasonic Intellectual Property Management Co., Ltd.

Signed and Sealed this
Twenty-eighth Day of May, 2019

Andrei Iancu
*Director of the United States Patent and Trademark Office*